United States Patent
Panah et al.

(10) Patent No.: US 9,705,707 B1
(45) Date of Patent: Jul. 11, 2017

(54) ESTIMATING SIGNALS IN SUB-SAMPLED SYSTEMS

(71) Applicant: Facebook, Inc., Menlo Park, CA (US)

(72) Inventors: Ali Yazdan Panah, San Francisco, CA (US); Karthik Yogeeswaran, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/065,679

(22) Filed: Mar. 9, 2016

(51) Int. Cl.
| | | |
|---|---|---|
| *H04L 25/02* | (2006.01) | |
| *H04L 5/00* | (2006.01) | |
| *H04B 7/0413* | (2017.01) | |

(52) U.S. Cl.
CPC ....... *H04L 25/0204* (2013.01); *H04B 7/0413* (2013.01); *H04L 5/0048* (2013.01)

(58) Field of Classification Search
CPC .. H04L 25/0204; H04L 5/0048; H04B 7/0413
See application file for complete search history.

(56) References Cited

U.S. PATENT DOCUMENTS

| | | | |
|---|---|---|---|
| 6,222,592 B1 * | 4/2001 | Patel | H04L 25/03006 348/607 |
| 2009/0180558 A1 * | 7/2009 | Ma | H04L 25/03006 375/260 |

\* cited by examiner

*Primary Examiner* — Sophia Vlahos
(74) *Attorney, Agent, or Firm* — Perkins Coie LLP

(57) ABSTRACT

Embodiments are disclosed for improving precoder-matrix computations in a MIMO base station. Particularly, various embodiments implement methods for interpolating pilot signal results from multiple calibration transmissions. A subchannel of a resource block is selected as an anchor subchannel and the channel matrices for each subchannel are then determined using weights associated with each subchannel that are determined from the subchannel's distance away from the anchor subchannel. Selecting variable subchannels allows the accuracy of the channels matrices for the subchannels to be tailored where more accuracy is desired.

20 Claims, 21 Drawing Sheets

FIG. 8

ESTIMATING SIGNALS IN SUB-SAMPLED SYSTEMS

TECHNICAL FIELD

The disclosed embodiments relate to multiple-input multiple-output (MIMO) communications schemes.

BACKGROUND

Multi-user multiple-input multiple-output (MU-MIMO) systems with a large number of base station antennas provide high throughput communications for emerging wireless deployments. By spatially multiplexing signals, a base station antenna array may serve many separate user terminals using the same time-frequency resource. This spatial resource sharing policy may serve as an alternative to costly spectrum licensing and avoid the costly procurement of additional base stations.

Although the benefits of spatial multiplexing may be fully realized when the number of base station antennas is equal to the number of scheduled user terminals, MU-MIMO systems with an excessively large number of antennas, also known as "Massive MIMO" may also provide additional benefits. Massive MIMO can increase the system's capacity while simultaneously improving the radiated energy efficiency via energy focusing. Massive MIMO systems can also be integrated with inexpensive, lower power components.

Unfortunately, massive MIMO implementations present some very challenging engineering aspects, including, e.g., antenna design, pilot contamination, inter-cell interference management, and hardware impairments. Additionally, the computational burden required to determine precoding matrices that compensate for variations in channel conditions may often be unreasonable. This is particularly true in dynamic environments where pilot signal calibrations must be frequently performed as channel conditions change. There exists a need for systems and methods to facilitate efficient channel recalibration despite these substantial computational burdens.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 8 illustrates coefficients determined for a number of subchannels of a resource block in accordance some embodiments;

Figure 1:
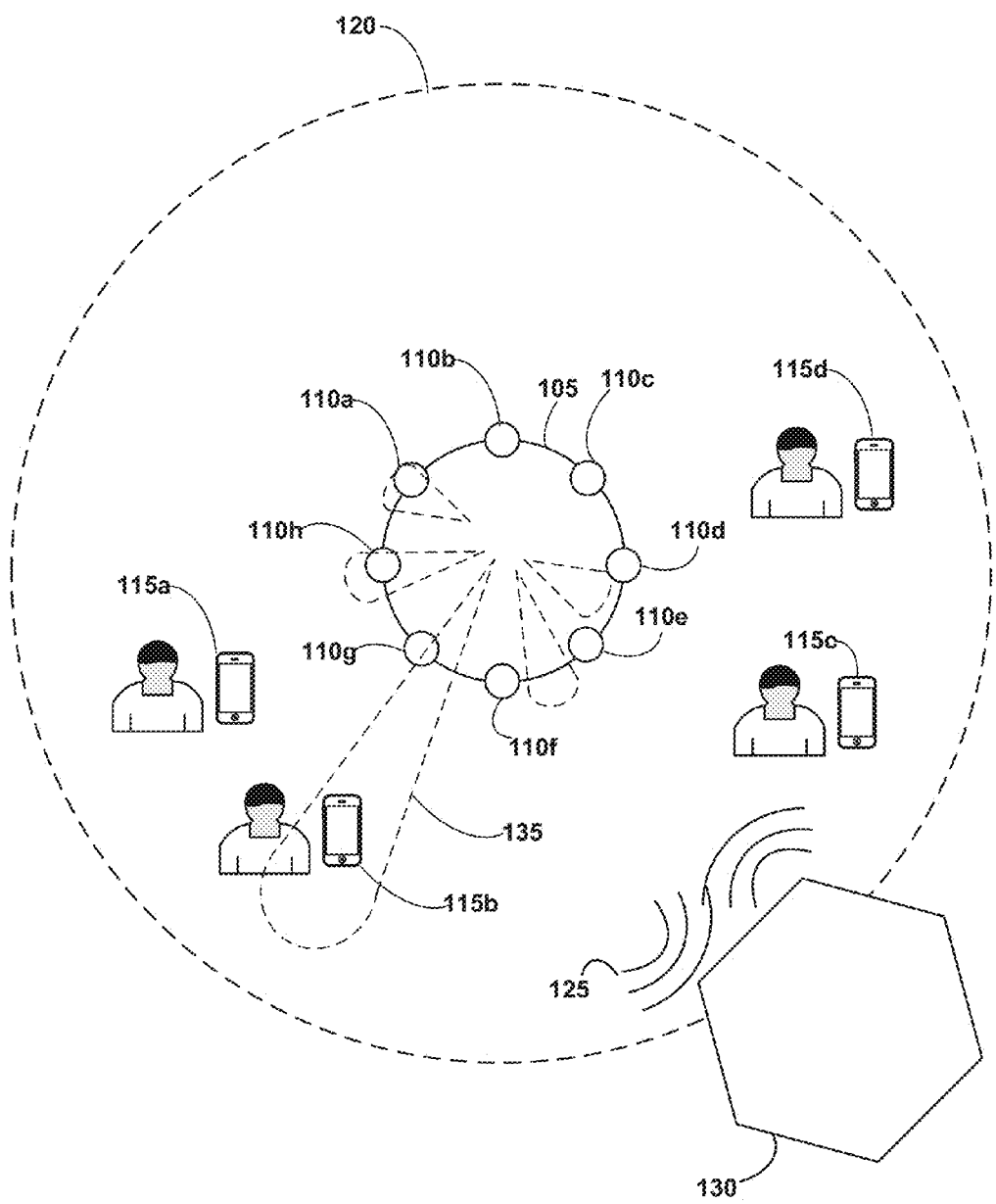
FIG. 1 is a block diagram illustrating an example MIMO coverage topology with several users as may be implemented in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Described herein are embodiments for improving the computation of channel matrices in MIMO communication systems and particularly in MU-MIMO communication systems. Various embodiments compute channel matrices for the OFDM subchannels on which pilot signals are not received by interpolating values associated with pilot signals that are received. In some embodiments, the interpolation can employ a regression function or a polynomial interpolation to compute weights that relate to a subchannel frequency response for signals transmitted between a particular user and a particular antenna of the MIMO communication system.

In some embodiments, one subchannel is selected as an anchor point and the regression function is used along with the distance that each subchannel is away from the anchor point to compute a number of coefficients for each subchannel.

In some embodiments, the subchannel that is selected as the anchor point for the resource block varies among the resource blocks. In some embodiments, anchor subchannels are selected toward the lowest frequency subchannel in the lowest frequency resource block and toward the highest frequency subchannel in the highest frequency resource block. In some embodiments, anchor subchannels are selected in the middle of a resource block for resource blocks in the middle of a frequency range.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Channel Structure

Turning now to the Figures, FIG. 1 a block diagram illustrating a simplified MU-MIMO communication system topology with several users as may be implemented in some embodiments. Though the MU-MIMO system 105 in this example is illustrated with eight antennas 110a-h to facilitate understanding, one will recognize that a real-world MU-MIMO system may employ significantly more antennas (e.g. 12+ antennas). The antennas are illustrated as being arranged in a circle however this is not required. Signals to two or more of the antennas 110a-h are weighted and delayed using beamforming techniques so that the signals constructively combine with each other in the direction of the desired user and destructively interfere with one another in other directions. In this manner, the system 105 may selectively communicate with each of the user devices 115a-d with minimized interference.

As will be appreciated by those skilled in the art, in order to be able to accurately send and receive signals between the user devices and the MU-MIMO system, the radio frequency channels must be characterized. In OFDM systems, handsets (e.g. UE's) send and receive signals on a number of subchannels. A channel matrix characterizes signals sent on the particular subchannel between each antenna of the MU-MIMO system and each user device. In general, the channel matrices are computed from pilot signals that are transmitted by the UE to the MU-MIMO system. Because signal conditions change, the channel matrices must be periodically updated. If pilot signals were to be transmitted on each subchannel every time the channel matrices were updated, there would be less bandwidth available for data communications. Therefore, the disclosed embodiments relate to computing values for the channel matrices using the results of pilot signals transmitted on less than all the available subchannels.

As will be explained in further detail below, in a MIMO or MU-MIMO communication system, transmissions to and from users of the system occur using resource blocks. Each resource block contains a set of resource elements that are defined by a subchannel, a time period and a symbol with which transmissions are allowed to take place between a user and the MIMO system. The resource block can be thought of as a two dimensional array of resource elements with each element representing a particular time slot on a particular subchannel.

In some embodiments, a MIMO communication system will utilize 256 subchannels of radio frequency spectrum. Of these, subchannels 1-38 and 220-256 are reserved as guard bands. That leaves 180 subchannels available for communication. In some embodiments, these 180 subchannels are divided into groups of 12 adjacent subchannels that form resource blocks with subchannels 124-135 serving as a resource block for control signals. Therefore, there are 14 resource blocks available for transmitting data between users and a base station. Those skilled in the art will recognize that other configurations of radio frequency spectrum are possible. Typically, the division of spectrum is set forth in an applicable standard (e.g. 3GPP LTE, IEEE 802.11, 802.16 or the like).

To determine the propagation conditions between different user devices and each antenna of the MIMO system, the system may periodically transmit a number predefined signals that are typically referred to as "pilot tones" or "pilot signals." The pilot tones/signals are known bit patterns that are analyzed upon receipt to determine characteristics of the communication channel between the base station and the user. Knowing the channel conditions allows the base station to determine a precoding matrix that equalizes the signals sent to and/or received from a user in order to overcome or lessen the distortion of the communication channel. In some embodiments, the users transmit the pilot signals to the base station at a predetermined time on predetermined subchannels. In other embodiments, the base station transmits pilot signals to the users and the users report back to the base station how the pilot signals are received.

A channel matrix, may reflect a number of complex coefficients $C_{mn}$ reflecting the relation between the K users and the M antennas. Over time, the communication channel conditions likely change so that the channel matrix must be periodically recalculated. The pilot signals may be re-transmitted on subcarriers, e.g. frequencies, and symbol times that are known to both the transmitter and the receiver. The receiver may use this "positional" information along with its knowledge of the actual pilot signals to arrive at an estimate of the multi-path channel between itself and the transmitter. The accuracy (fidelity) of the estimation process may therefore be directly linked to the end performance of the communication system. Three factors may influence this accuracy: noise on the communication channel; limited pilot signal resources; and methods of estimation.

With regard to noise, as with any statistical estimation process, thermal noise at the receiver will degrade the accuracy of the estimation of the pilot signals. With regard to limited pilot signal resources, since the OFDM channel will be estimated across the entire frequency band (at every subcarrier), the transmitter could allocate pilot signals to every subchannel in the band. However, this approach would leave no subchannels for actual data transmission within the resource block, leading to zero throughput. One solution to this problem is to sub-sample the frequency band by placing pilot signals at predefined intervals. Once the channel is estimated at the subchannels where the pilot signals are received, the channels conditions for the other subchannels can be estimated using interpolation or extrapolation techniques. This interpolation/extrapolation process can introduce additional inaccuracy in the channel estimation process and so should be carefully designed.

Figure 6:
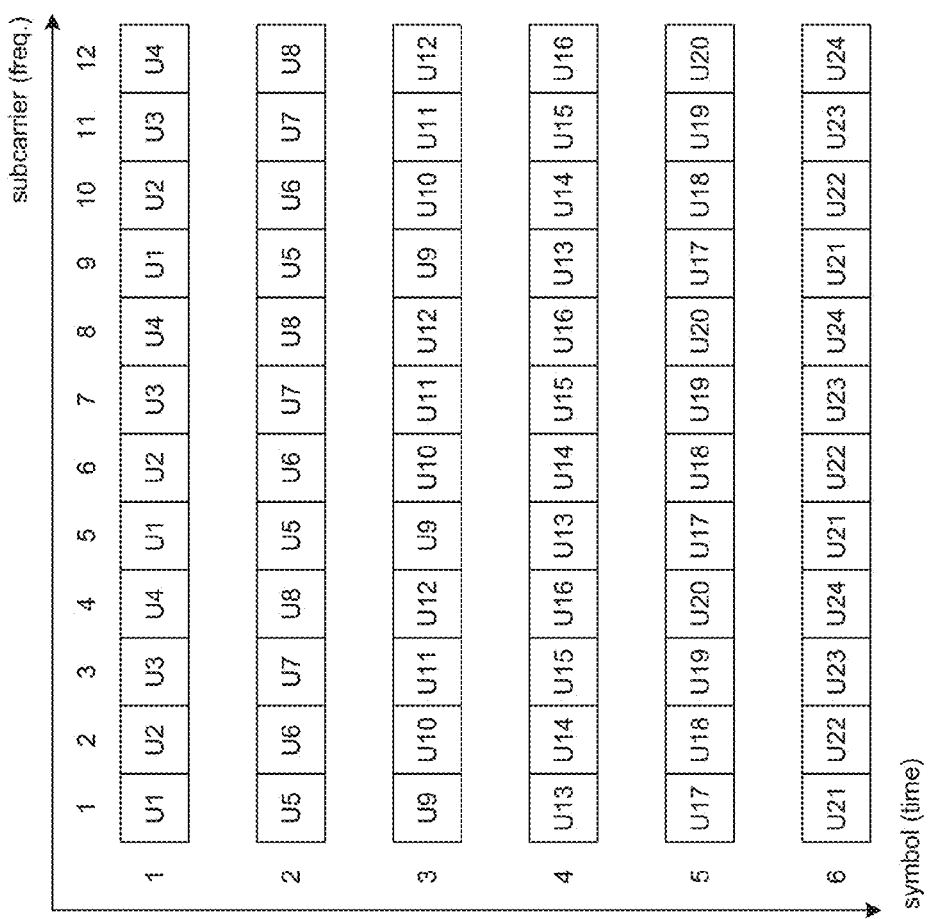
FIG. 6 is an illustration of an exemplary pilot signal allocation for one resource block (RB) consisting of 12 subcarriers and 6 symbols as may occur in some embodiments.

FIG. 6 shows an example of sending pilot signals for a single resource block on less than all available subchannels to each user. In this example, pilot signals are transmitted between user 1 and the base station in time slot 1 on subchannels 1, 5 and 9. Pilot signals are transmitted between user 2 and the base station in time slot 1 on subchannels 2, 6 and 10. Similarly, pilot tones are transmitted between user 24 and the base station in time slot 6 on subchannels 4, 8 and 12.

With regard to methods of estimation, the method used for obtaining the channel estimate over the pilot signals may affect the accuracy of the over-all estimation. Maximum likelihood (ML) estimation and minimum mean-square error (MMSE) estimation are two popular methods. Various of the disclosed embodiments implement ML estimation.

Figure 2:
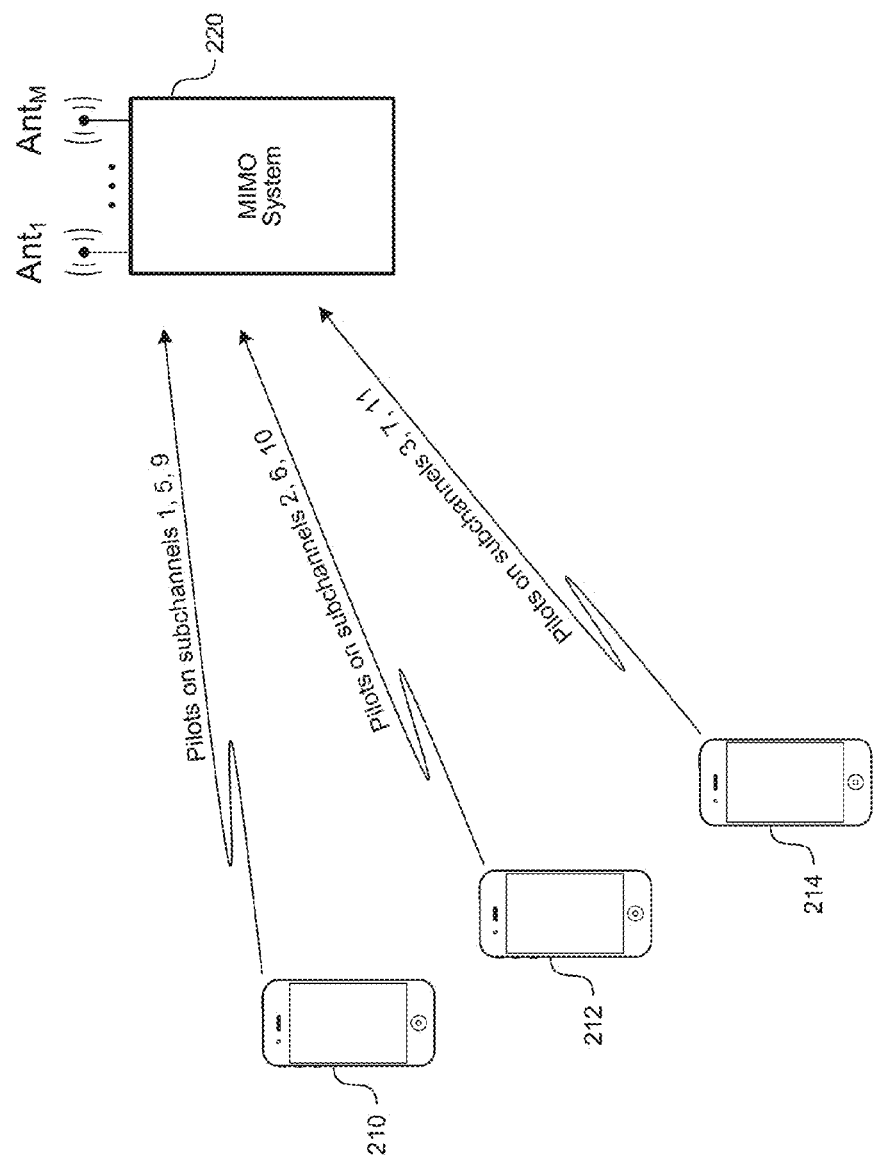
FIG. 2 illustrates a number of users transmitting pilot signals to a MIMO system on a subset of available subchannels in accordance with some embodiments.

FIG. 2 shows an example of three users 210, 212 and 214 transmitting pilot signals back to the MIMO system 220 on different subchannels. User equipment 210 sends pilot signals back to MIMO system 220 on subchannels 1, 5 and 9. User equipment 212 sends pilot signals back to MIMO system 220 on subchannels 2, 6 and 10 while user equipment 214 sends pilot signals back to the MIMO system 220 on subchannels 3, 7 and 11. The MIMO system computes the channel matrices for each of the users on each of the channels by interpolating the measurements of the pilot signals received.

Example Precoding Calibration Process

Figure 3:
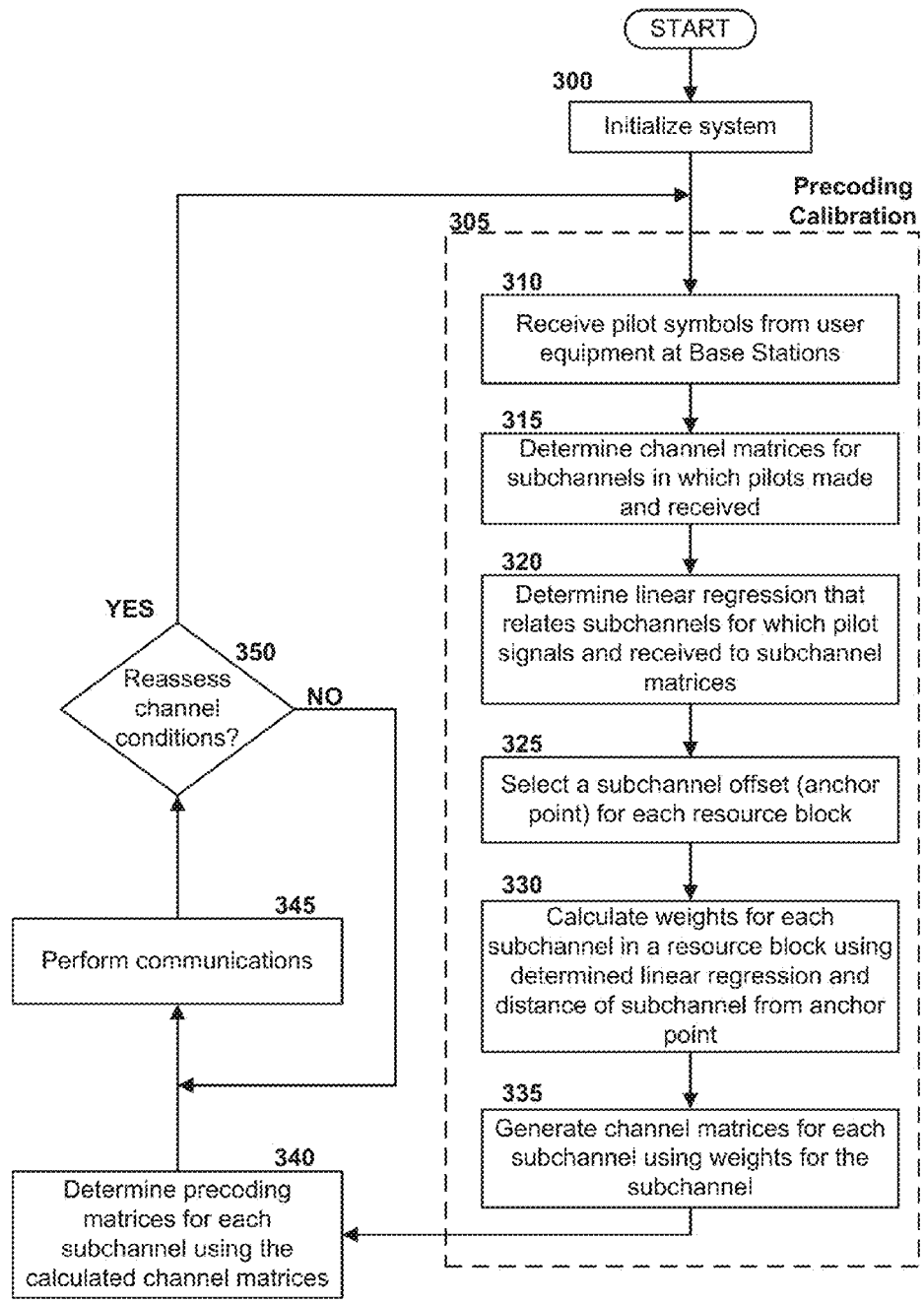
FIG. 3 is a flow diagram illustrating various high level steps as may occur in a variable precoding algorithm in some embodiments.

FIG. 3 is a flow diagram illustrating various high level steps as may occur in some embodiments. At block 300, the base station may be initialized (e.g., powered on and prepared for operations with user devices). The base station may then perform a precoding calibration 305 using various of the methods discussed herein. The precoding calibration 305 may determine channel matrices for a resource block of subchannels based on how pilot signals are received on a select number of subchannels.

In some embodiments, a base station of the system may receive (or transmit) pilot signals from (or to) user devices at block 310 on a number of subchannels that are known to both the base station and the users. The subchannels may be subsets of frequencies within a larger collection of frequencies referred to herein as resource blocks (RB). The recipient (the base station or user device) of the pilot signals may determine multi-path channel estimates for each subchannel on which a pilot signal was received at block 315. At 320, in accordance with some embodiments, a linear regressor is calculated that relates the subchannel number on which pilot signals are received to the multi-path channel estimation determined for the subchannel. The subchannel number is the number of subchannels measured from the first subchannel in the resource block. In the example described above, subchannel 39 is number 1, subchannel 40 is number 2, subchannel 41 is number 3 etc. At block 325, an anchor point or particular subchannel is selected for the resource block. The anchor point could be any one of the subchannels.

However, as described in further detail below, in some embodiments, the anchor points are selected to be the lowest frequency subchannel for resource block 1 and the highest frequency subchannel for the resource block 14. Anchor points are selected in the middle of subchannels for the resource blocks in the middle of the frequency range.

At 330, a number of weights are calculated using the linear regressor determined at 320 and the anchor point selected for a particular resource block. The weights can be stored in a look up table for quick access during channel estimation.

At 335, the entries for the channel matrix associated with each antenna/subchannel combination are calculated using the weights for the channel and the multi-path channel estimation determined for the subchannels on which pilot signals are received. For example, if pilot signals are received on subchannels 39, 43 and 47, a channel estimation for subchannel 40 can be determined by the linear combination of $$(w_1 \cdot CH[39] + w_2 \cdot CH[43] + w_3 \cdot CH[47])$$

where $w_1$, $w_2$, $w_3$ are the weights determined for subchannel 40 and CH[39], CH[43] and CH[47] are the multi-path estimations for the subchannels on which the pilot signals are received.

Once the full channel matrices are determined for all the user/antenna combinations and for all the channels, the precoding matrices are determined at 340 as described in further detail below. Communications may be then performed at block 345 using the precoding matrices until a reassessment is determined to be needed at 350 and a new channel computation at 305 is performed.

Figure 4:
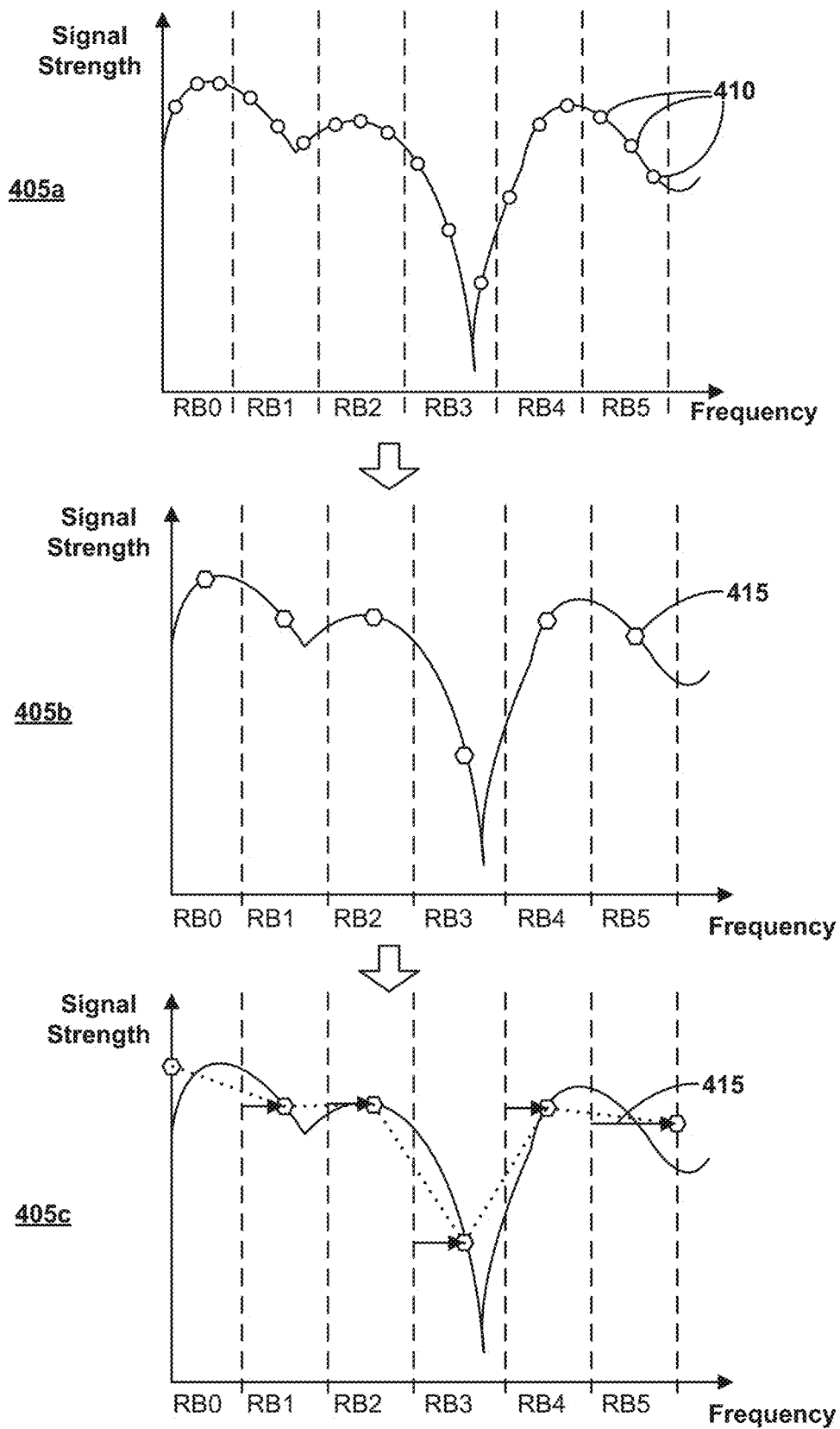
FIG. 4 shows a series of plots reflecting the determination of anchor subchannel displacements as may occur in some embodiments.

FIG. 4 is a series of plots showing how the anchor points can be moved within the subbands of a resource block in order to compute the precoding matrices. Plot 405a shows a simulated reception strength at a receiver using a precoding matrix that is calculated using the channel estimations from fixed subbands (e.g. three subbands within each resource block). Plot 405b shows a simulated result if the anchor points are moved to a subband in the middle of each resource block. Plot 405c shows a simulated reception strength if the anchor points are moved to the band edges (indicated by the small hexagons) for the lowest frequency resource block RB0 and the highest frequency resource block RB5. The anchor points are placed in roughly the middle of the subbands for those subbands having frequencies in between the lowest and highest frequency resource blocks (e.g. resource blocks RB1-RB4).

As will be explained in detail below, the channel matrices are more accurate for subbands that are closer to the anchor points. Therefore, by placing the anchor points at variable locations in the resource block, the accuracy of the channel interpolation process can be controlled. In the example shown, the need for accurate channel matrices at the lowest frequency subchannels in resource block RB0 and at the highest frequency subchannels in resource block RB5 may be greater than the accuracy required for the channel matrices for the subbands in the middle resource blocks. Having the weights for computing the channel matrices precomputed as a result of the known anchor points increases the speed with which the channel matrices (and therefore the precoding matrices) can be computed. In addition, by putting the anchor points at the ends of the frequency spectrum, the channel matrices can be determined by interpolation without the use of extrapolation, which is generally considered to be less accurate.

Variable Fidelity Precoding—Overview

The Variable Fidelity Precoding (VFP) methods presented in various of the embodiments disclosed herein compute precoding matrices from sub-sampled channel estimates. Sub-sampled channel estimates may be statically allocated in many systems, resulting in fixed fidelity metrics across the band. In contrast, the VFP method may use anchor displacement sets of the type shown in plot 405c (FIG. 4) discussed above to provide greater flexibility, i.e., variability, in the accuracy of the precoding computation. Specifically, the anchors may be placed on (or clustered towards) sub-carriers in need of higher fidelity estimations. In some embodiments, this localized higher fidelity may be achieved at the expense of lower fidelity estimates at other subcarrier locations. The anchor displacement set may also be determined based upon specific system fidelity requirements and goals, which may vary from system to system and over time. Numeric results for a precoded MU-MIMO-OFDM system are provided herein as well as a use-case where VFP is shown to substantially reduce the errors caused by extrapolation of precoder estimates at the band edges.

Channel estimation can be a key component of a coherent wireless system based on orthogonal frequency division multiplexing (OFDM). Moreover, accurate channel estimation can be a key precursor to designing precise precoding matrices used in multiple-input multiple-output (MIMO) systems. Such systems use linear precoding to simultaneously deliver uplink/downlink data streams to multiple users in the system. Combining a linearly precoded multiuser MIMO system (MU-MIMO) with OFDM modulation techniques at the baseband, can lead to spectrally efficient multiple access schemes capable of handling complicated non-line of sight (NLOS) multi-path channel environments. Designing MU-MIMO-OFDM systems in practice can involve a multitude of engineering considerations, including channel estimation and precoder design. Various embodiments implement VFP as a low-complexity means of achieving flexible MU-MIMO-OFDM linear precoding design.

Linear Precoding (MIMO)

Linear precoding is a low-complexity alternative to other MU-MIMO precoding (sometimes referred to as "dirty paper coding"). Various embodiments disclosed herein focus on a particular form of precoding called zero-forcing (ZF) where the criteria is to eliminate interference at each user in the downlink seen from all other users. To mathematically formulate the ZF precoder, consider a linearly precoded MU-MIMO-OFDM system over N subcarriers with M antennas at the base station serving K users. Let $s[n]=[s_{n,1}, s_{n,2}, \ldots s_{n,K}]$ represent the baseband QAM symbols intended for the user terminals at subcarriers n and let $F[n]=[f_{n,1}, f_{n,2}, \ldots, f_{n,K}]$ be the M×K precoding matrix at subcarrier n so that $f_{n,k}$ is the beamforming vector allocated to user K by the base station for subcarrier n. The MIMO channel can be modeled by the K×M matrix C[n] at subcarrier n, and one can model the noise at the users by the K length vector n[n]. The received signals at the users in the downlink is of the form:

$$r[n]=C[n]F[n]s[n]+n[n] \quad (1)$$

The ZF precoding solution at subcarrier n is the precoder matrix F[n] such that the MIMO channel is diagonalized: $C[n]F[n]=D[n]$, where D[n] is a K×K diagonal matrix. The solution is the Moore-Penrose pseudo-inverse given by:

$$F[n]=C[n]^H(C[n]C[n]^H)^{-1} \quad (2)$$

where C[n] is the channel matrix for subchannel n, $C[n]^H$ is the conjugate-transpose of the MIMO channel matrix and $C[n]^{-1}$ represents a matrix inverse. In practice, the channel matrix may not be perfectly known, but must first be estimated, so that $C[n]=\hat{C}[n]$. For simplicity, one may assume that the estimation is performed on a per-user and per-antenna basis (across subcarriers), i.e. a total of M×K point-to-point OFDM channel estimations.

Variable Fidelity Precoding (VFP) Example Operation

This section explains the concept of VFP as it may be implemented in some embodiments in three steps: Clustering and channel estimation; anchoring and precoder interpolation; and configurable anchors.

Figure 5:
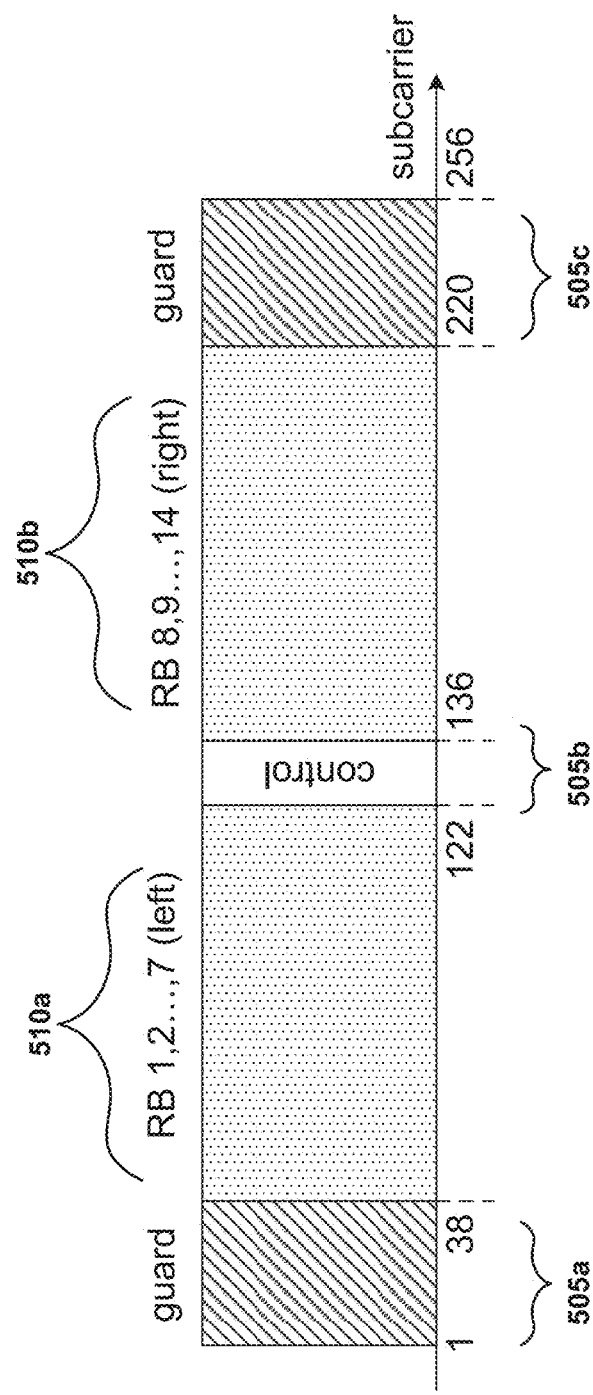
FIG. 5 illustrates an exemplary resource partition over a frequency band with 256 total subcarriers as may be used in some embodiments.

Variable Fidelity Precoding (VFP) Example Operation—Step I: Clustering and Channel Estimation This step may roughly correspond to blocks 315-335 in FIG. 3. Though VFP is here explained in the context of a specific example, one will readily recognize that the concept extends to other numeric cases. Consider a wireless system consisting of a (massive) MU-MIMO-OFDM system using N=256 subcarriers with M=96 antennas at the base station serving K=24 single-antenna users. The system may use time-division duplexing (TDD) to transmit uplink and downlink information over successive 10 ms frames. FIG. 5 is an example resource partition over a frequency band with 256 total subcarriers as may be used in some embodiments. Of the available 256 subcarriers, a total of 180 are used for transmission of information in this example. Subcarrier indices 1 through 38 and 220 through 256 may be reserved for guard bands (505a-c), while subcarrier indices 123 through 135 may be reserved for control channels (505b).

A resource block (RB) is a fixed set of subcarriers, e.g., a cluster of 12 adjacent subcarriers. In this example, the usable portion of the bandwidth, i.e. 180 subcarriers, translates to 15 RBs with 14 RBs available for use in transmitting and receiving data and 1 RB available as a control channel. The wireless channel to and from each user (and between each user and each base station antenna), may be estimated using pilot signals sent from the users or base station during a total of 6 symbols. During this phase, each user may be allocated a predefined (static) "pilot signal pattern" over the RBs. This pattern may dictate on which subcarriers the users need to transmit their respective pilot signals. This pattern is illustrated in FIG. 6 for one RB.

FIG. 6 is an illustration of an example pilot signal allocation over one resource block (RB) consisting of 12 subcarriers and 6 symbols as may occur in some embodiments. Each user is allocated 3 pilot signals per RB and this pattern is repeated over the frequency band. The same pattern may be repeated over the 14 information bearing RBs (not shown in the figure). FIG. 6 shows how each user is allocated a total of 3 pilot signals per RB in uniform spacing. The channel estimation process at the base station may use these 3 pilot signals to obtain a single channel estimate representing the particular RB in which the pilots reside. This process may be repeated for each user (24 total) and each antenna (96 total) over all 14 RBs. Note that the uplink pilot phase may not be precoded on the user side.

To provide further clarifying detail, consider the following example construction of the precoding matrices. Consider RB 1 for user 1 and antenna 1 at the base station. Let $C_{k,m}[n]$ denote the (k,m) element of the MIMO channel matrix in (1) for subcarrier n. Some embodiments estimate the MIMO channel matrix by estimating each of the elements of the matrix separately. Let $\{p_1[39], p_1[43], p_1[47]\}$ denote the QPSK pilot signals for user 1 over subcarriers 39, 43, 47 (see FIG. 6), and correspondingly $\{r_1[39], r_1[43], r_1[47]\}$ denote the received signal at antenna 1 of the base station. Thus, $$r_1[39] = C_{1,1}[39]p_1[39] + n_1[39] \quad (3)$$

$$r_1[43] = C_{1,1}[43]p_1[43] + n_1[43] \quad (4)$$

$$r_1[47] = C_{1,1}[47]p_1[47] + n_1[47] \quad (5)$$

where $\{n_1[39], n_1[43], n_1[47]\}$ are noise values. Using $\{r_1[39], r_1[43], r_1[47]\}$, the base station may arrive at an estimate of the channel element $C_{1,1}$ as follows: First, an estimate of the channel at antenna may be obtained by removing the effects of the pilot signal:

$$\hat{C}_{1,1}[39] = r_1[39](p_1[39])^* \quad (6)$$

$$\hat{C}_{1,1}[43] = r_1[43](p_1[43])^* \quad (7)$$

$$\hat{C}_{1,1}[47] = r_1[47](p_1[47])^* \quad (8)$$

Next, a single estimate of the channel for this RB (in this case RB 1) can be obtain using a weighted average of the three estimations obtained above:

$$\hat{C}_{1,1}^{(1)} = w_{1,1}^{(1)} \times \hat{C}_{1,1}[39] + w_{1,2}^{(1)} \times \hat{C}_{1,1}[43] + w_{1,3}^{(1)} \times \hat{C}_{1,1}[47] \quad (9)$$

where $\hat{C}_{1,1}^{(1)}$ is the final channel estimate for user 1 at antenna 1 on RB 1 and $\{w_{1,1}^{(1)}, w_{1,2}^{(1)}, w_{1,3}^{(1)}\}$ denote the weights for user 1. Selection of the weighting factors is discussed in greater detail herein. Similarly for user 2, the base station may arrive at $\hat{C}_{2,1}^{(1)}$, and so on (for k=1, 2, ..., 24 and m=1, 2, ..., 96) until the base station has all the elements necessary for a complete estimation for the MIMO channel matrix $\hat{C}^{(1)}$ representing this RB. Given that the channel estimation process is done on a per-RB basis, the MIMO channel matrices of (1) may be obtained after the pilot transmission phase is complete. In other words, once the pilot transmission phase is over (after, e.g., 6 pilot symbols), the base station may arrive at 14 separate MIMO channel estimations $\{\hat{C}^{(1)}, \hat{C}^{(2)}, \ldots, \hat{C}^{(14)}\}$ representing the 14 RBs in the band.

Note that each $\hat{C}^{(j)}$ is a MIMO channel estimation representing a group of 12 subcarriers for the $j^{th}$ RB. For example $\hat{C}^{(1)}$ is the MIMO channel estimate for RB 1 that includes subcarriers n=39, 40, 41, ..., 49, 50. With these estimates the base station may proceed to compute the ZF precoding matrices for each RB using (2) to arrive at $\{\hat{F}^{(1)}, \hat{F}^{(2)}, \ldots, \hat{F}^{(14)}\}$.

As a final step in some embodiments, the base station may interpolate this set of precoder values to arrive at precoding matrices at all information bearing subcarriers $$\{\hat{F}^{(1)}, \hat{F}^{(2)}, \ldots, \hat{F}^{(14)}\} \rightarrow \quad (10)$$

$$\underbrace{\{\hat{F}[39], \hat{F}[40], \ldots, \hat{F}[122]}_{\text{RB 1 to RB 7 (84 matrices)}}, \underbrace{\hat{F}[136], \hat{F}[137], \ldots, \hat{F}[219]\}}_{\text{RB 8 to RB 14 (84 matrices)}}$$

Note that given the guard bands on each side of the frequency band along with a control channel in the mid portion of the band, the base station may choose to interpolate over two sets corresponding to "left half" and "right half" RBs:

left half: $\{\hat{F}^{(1)}, \hat{F}^{(2)}, \ldots, \hat{F}^{(7)}\} \rightarrow \{\hat{F}[39], \hat{F}[40], \ldots, \hat{F}[122]\}$ (11)

right half: $\{\hat{F}^{(8)}, \hat{F}^{(9)}, \ldots, \hat{F}^{(14)}\} \rightarrow \{\hat{F}[136], \hat{F}[137], \ldots, \hat{F}[219]\}$ (12)

Variable Fidelity Precoding (VFP) Example Operation—Step II: Anchoring and Precoder Interpolation This step may correspond to block 325. The precoder interpolation in (10) utilizes "anchoring" (or indexing) of the precoding matrices $\{\hat{F}^{(1)}, \hat{F}^{(2)}, \ldots, \hat{F}^{(14)}\}$ before the actual interpolation process can be performed. By "anchoring," the precoding matrix may be assigned to a specific subcarrier index within its respective RB. For example, $\hat{F}^{(1)}$ is a representative of the precoding matrices for subcarriers in RB 1, i.e. n=39, 40, ..., 50. So, $\hat{F}^{(1)}$ may be assigned to a subcarrier within these limits, for instance $\hat{F}^{(1)} = \hat{F}[42]$. Since there is a one-to-one mapping between each precoder matrix and the MIMO channel matrix, the anchoring may be performed on the channel matrices instead. Once the anchors are chosen, polynomial based interpolation can yield the missing precoders on all subcarriers. For example for the left half of the RBs:

$$(\text{step } a): \{\underbrace{\hat{C}^{(1)}, \hat{C}^{(2)}, \ldots, \hat{C}^{(7)}}_{\text{7 estimates}}\} \overset{\text{anchor}}{\Longrightarrow} \underbrace{\{\hat{C}[42], \hat{C}[55], \ldots, \hat{C}[120]\}}_{\text{7 anchors}} \quad (13)$$

$$(\text{step } b): \{\underbrace{\hat{C}^{(1)}, \hat{C}^{(2)}, \ldots, \hat{C}^{(7)}}_{\text{7 anchors}}\} \overset{\text{precoder}}{\Longrightarrow} \underbrace{\{\hat{F}[42], \hat{F}[55], \ldots, \hat{F}[120]\}}_{\text{7 anchors}} \quad (14)$$

$$(\text{step } c): \quad (15)$$

$$\underbrace{\{\hat{F}[42], \hat{F}[55], \ldots, \hat{F}[120]\}}_{\text{7 anchors}} \overset{\text{interp}}{\Longrightarrow} \underbrace{\{\hat{F}[39], \hat{F}[40], \ldots, \hat{F}[122]\}}_{\text{7 subcarriers}}$$

Various embodiments implement piecewise-linear interpolation over the anchors with linear extrapolation on both sides.

Variable Fidelity Precoding (VFP) Example Operation—Step III: Configurable Anchors This step may also correspond to operations at block 325. Some embodiments implement a mechanism to select anchor points for the channel estimates. The "anchor displacement" set d=$\{d_1, d_2, \ldots, d_{14}\}$ where $d_i$ is an integer between 0 and 11 that represents the displacement of the anchor within each RB relative to the first subcarrier index of that RB. Left and right anchor sets may again be considered $d_l=\{d_1, d_2, \ldots, d_7\}$, $d_r=\{d_8, d_9, \ldots, d_{14}\}$. For example, if $d_l=\{6, 6, 6, 6, 6, 6, 6\}$ then $$\hat{C}^{(1)} \overset{\text{anchor}}{\Longrightarrow} \hat{C}[39+6] \quad (16)$$

$$\hat{C}^{(2)} \overset{\text{anchor}}{\Longrightarrow} \hat{C}[51+6] \quad (17)$$

$$\hat{C}^{(3)} \overset{\text{anchor}}{\Longrightarrow} \hat{C}[63+6] \quad (18)$$

$$\hat{C}^{(4)} \overset{\text{anchor}}{\Longrightarrow} \hat{C}[75+6] \quad (19)$$

$$\hat{C}^{(5)} \overset{\text{anchor}}{\Longrightarrow} \hat{C}[87+6] \quad (20)$$

$$\hat{C}^{(6)} \overset{\text{anchor}}{\Longrightarrow} \hat{C}[99+6] \quad (21)$$

$$\hat{C}^{(7)} \overset{\text{anchor}}{\Longrightarrow} \hat{C}[111+6] \quad (22)$$

With the anchor points set, the locations of the channel estimates are set. The system may now compute the value of the channel estimates at the anchor points (e.g., corresponding to block 335). A weighted average approach was previously described to calculate the channel estimates for each RB (see EQN. 9). Note how the channel estimate was a weighted average of the received signals at fixed subcarrier indices corresponding to the pilot signal locations for the particular user. For example in EQN. 9, the pilot signal were received on subchannels 39, 43, 47. The anchor point however may differ from these points. For example, in EQN. 13 the corresponding anchor point was 42. Some embodiments therefore employ a method to infer the channel conditions for any subcarrier within the resource block based upon the pilot tone locations of the received signal.

Some embodiments use linear regression over the RB channel estimates to obtain these values. For example, the channel estimates $\hat{C}_{1,1}[39]$, $\hat{C}_{1,1}[43]$, $\hat{C}_{1,1}[47]$ in EQN. 6 over the subcarriers 39, 40, 41, 42, . . . , 50. This regressor can then be used to obtain the channel estimate at any anchor location, e.g., subcarrier 42 in this example. Fortunately no extra mechanism is needed to implement this approach since the weighting factors $\{w_{1,1}^{(1)}, w_{1,2}^{(1)}, w_{1,3}^{(1)}\}$ in EQN. 9 can be designed to directly perform the regression. Continuing with our example, the linear polynomial regressor can be obtained for pilot signals received on subchannels 1, 5 and 9 by solving the following equation for $\alpha$, $\beta$:

$$\begin{bmatrix} 1 & 1 \\ 5 & 1 \\ 9 & 1 \end{bmatrix} \begin{bmatrix} \alpha \\ \beta \end{bmatrix} = \begin{bmatrix} \hat{C}_{1,1}[39] \\ \hat{C}_{1,1}[43] \\ \hat{C}_{1,1}[47] \end{bmatrix} \Rightarrow \begin{bmatrix} \alpha \\ \beta \end{bmatrix} = \qquad (23)$$

$$\begin{bmatrix} -0.1250 & 0.0000 & 0.1250 \\ 0.9583 & 0.3333 & -0.2917 \end{bmatrix} \begin{bmatrix} \hat{C}_{1,1}[39] \\ \hat{C}_{1,1}[43] \\ \hat{C}_{1,1}[47] \end{bmatrix}$$

Other inverse matrices would be used for pilot signals received on other channel numbers. For example different matrices would be used for pilot signals received on subchannels 2, 6 and 10 as well for pilot signals received on subchannels 3, 7, and 11 or for subchannels 4, 8 and 12. As will be appreciated by those skilled in the art, the inverse matrix in Equation 23 is derived from a well-known Vandermond matrix.

Having determined $\alpha$ and $\beta$, the channel estimate at any anchor point may be determined as $i \times \alpha + \beta$ where i is the relative displacement from the beginning of the RB subcarriers, i.e. 39. In other words, i is the displacement given by the anchor displacement set defined in the previous section. Fortunately, EQN. 23 is a simple linear equation that can be computed for any displacement value in an offline fashion. Continuing with our example, the system may calculate the anchor channel estimate at subcarrier 42 by evaluating the linear regressor for a displacement value of 3:

$$\hat{C}_{1,1}[42] = \begin{bmatrix} 3 & 1 \end{bmatrix} \begin{bmatrix} \alpha \\ \beta \end{bmatrix} \qquad (24)$$

$$= \begin{bmatrix} 3 & 1 \end{bmatrix} \begin{bmatrix} -0.1250 & 0.0000 & 0.1250 \\ 0.9583 & 0.3333 & -0.2917 \end{bmatrix} \begin{bmatrix} \hat{C}_{1,1}[39] \\ \hat{C}_{1,1}[43] \\ \hat{C}_{1,1}[47] \end{bmatrix} \qquad (25)$$

$$= \begin{bmatrix} 0.5833 & 0.3333 & 0.0833 \end{bmatrix} \begin{bmatrix} \hat{C}_{1,1}[39] \\ \hat{C}_{1,1}[43] \\ \hat{C}_{1,1}[47] \end{bmatrix} \qquad (26)$$

$$= 0.5833 \times \hat{C}_{1,1}[39] + 0.3333 \times \hat{C}_{1,1}[43] + 0.08333 \times \hat{C}_{1,1}[47] \qquad (27)$$

Figure 7:
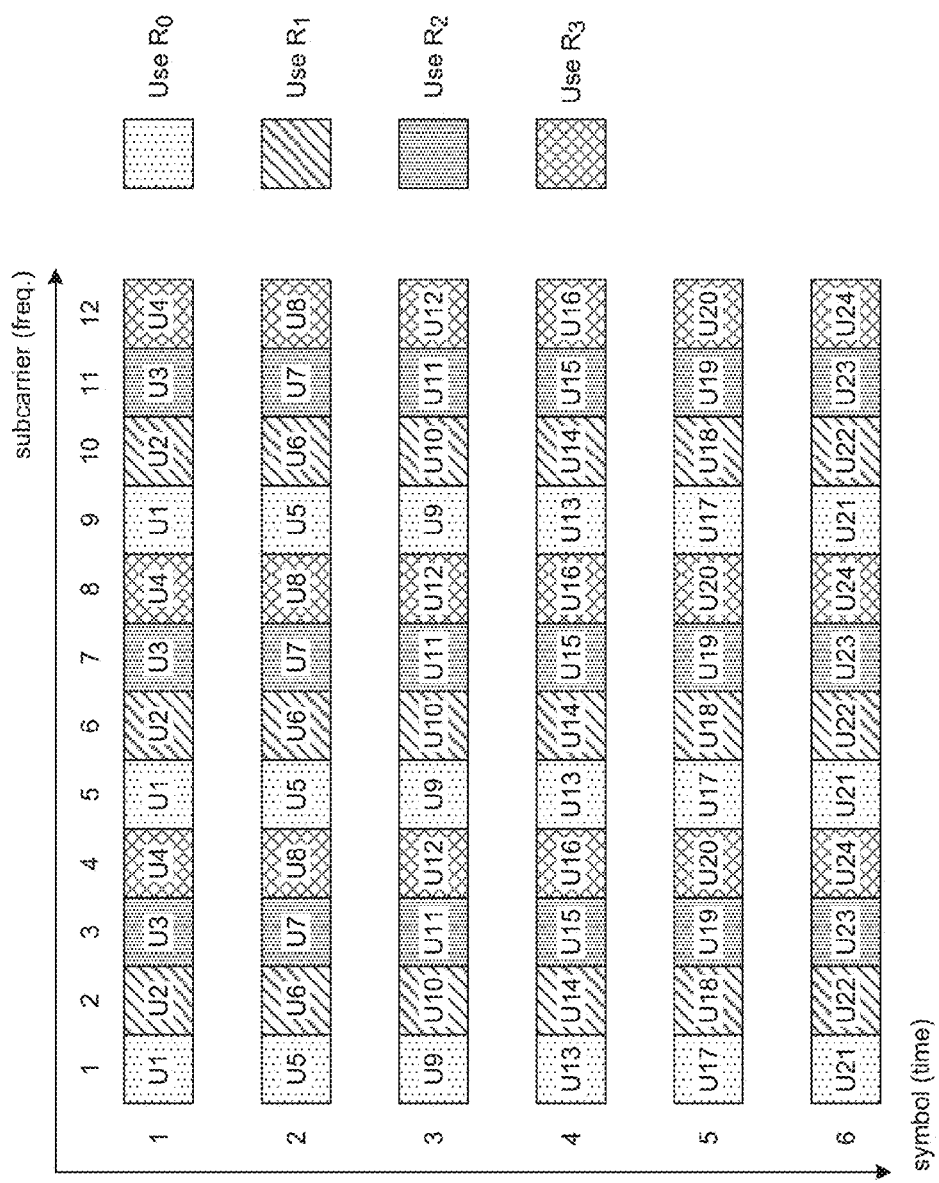
FIG. 7 is an illustration of one possible assignment of users to subchannels in a resource block as may be implemented in some embodiments.

Comparing this equation with (9), we see that the weights are defined as $\{w_{1,1}^{(1)}, w_{1,2}^{(1)}, w_{1,3}^{(1)}\} = \{0.5833, 0.3333, 0.0833\}$. This linear regression approach may be used to compute the anchored channel estimate values over all the users and over all the antennas and over all the RBs for any given anchor displacement set d. Fortunately, the weights can be computed once (e.g., offline). Note that while the weights are a function of the particular user in which the anchor is to be computed, this dependency may be only for the initial offset of the pilot tones for that user within the RB. Hence, for example, the weights for user 1, 5, 9, 13, 17, 21 will be the same (see, e.g., FIG. 6). Fortuitously, this permits the system to construct 4 (master) regression base matrices in which the weights needed to calculate the anchored channel estimates for any anchor displacement set may be obtained via a look-up table (LUT) fashion. Following the method of EQN. 24, the system may prepare the following regression base matrices where $R_0$ belongs to the users 1, 5, 9, 13, 17, 21, $R_1$ belongs to the users 2, 6, 10, 14, 18, 22, $R_2$ belongs to the users 3, 7, 11, 15, 19, 23 and $R_3$ belongs to the users 4, 8, 12, 16, 20, 24. This is illustrated in FIG. 7. Depending on the user in which the channel estimate is to be computed, the regression base matrix is chosen from four distinct sets.

$$R_0 = \begin{bmatrix} 0.8333 & 0.3333 & -0.1667 \\ 0.7083 & 0.3333 & -0.0417 \\ 0.5833 & 0.3333 & 0.0833 \\ 0.4583 & 0.3333 & 0.2083 \\ 0.3333 & 0.3333 & 0.3333 \\ 0.2083 & 0.3333 & 0.4583 \\ 0.0833 & 0.3333 & 0.5833 \\ -0.0417 & 0.3333 & 0.7083 \\ -0.1667 & 0.3333 & 0.8333 \\ -0.2917 & 0.3333 & 0.9583 \\ -0.4167 & 0.3333 & 1.0833 \\ -0.5417 & 0.3333 & 1.2083 \end{bmatrix} \qquad (28)$$

$$R_1 = \begin{bmatrix} 0.9583 & 0.3333 & -0.2917 \\ 0.8333 & 0.3333 & -0.1667 \\ 0.7083 & 0.3333 & -0.0417 \\ 0.5833 & 0.3333 & 0.0833 \\ 0.4583 & 0.3333 & 0.2083 \\ 0.3333 & 0.3333 & 0.3333 \\ 0.2083 & 0.3333 & 0.4583 \\ -00833 & 0.3333 & 0.5833 \\ -0.0417 & 0.3333 & 0.7083 \\ -0.1667 & 0.3333 & 0.8333 \\ -0.2917 & 0.3333 & 0.9583 \\ -0.4167 & 0.3333 & 1.0833 \end{bmatrix} \qquad (29)$$

$$R_2 = \begin{bmatrix} 1.0833 & 0.3333 & -0.4167 \\ 0.9583 & 0.3333 & -0.2917 \\ 0.8333 & 0.3333 & -0.1667 \\ 0.7083 & 0.3333 & -0.0417 \\ 0.5833 & 0.3333 & 0.0833 \\ 0.4583 & 0.3333 & 0.2083 \\ 0.3333 & 0.3333 & 0.3333 \\ 0.2083 & 0.3333 & 0.4583 \\ 0.0833 & 0.3333 & 0.5833 \\ -0.0417 & 0.3333 & 0.7083 \\ -0.1667 & 0.3333 & 0.8333 \\ -0.2917 & 0.3333 & 0.9583 \end{bmatrix} \quad (30)$$

$$R_3 = \begin{bmatrix} 1.2083 & 0.3333 & -0.5417 \\ 1.0833 & 0.3333 & -0.4167 \\ 0.9583 & 0.3333 & -0.2917 \\ 0.8333 & 0.3333 & -0.1667 \\ 0.7083 & 0.3333 & -0.0417 \\ 0.5833 & 0.3333 & 0.0833 \\ 0.4583 & 0.3333 & 0.2083 \\ 0.3333 & 0.3333 & 0.3333 \\ 0.2083 & 0.3333 & 0.4583 \\ 0.0833 & 0.3333 & 0.5833 \\ -0.0417 & 0.3333 & 0.7083 \\ -0.1667 & 0.3333 & 0.8333 \end{bmatrix} \quad (31)$$

Figure 8:
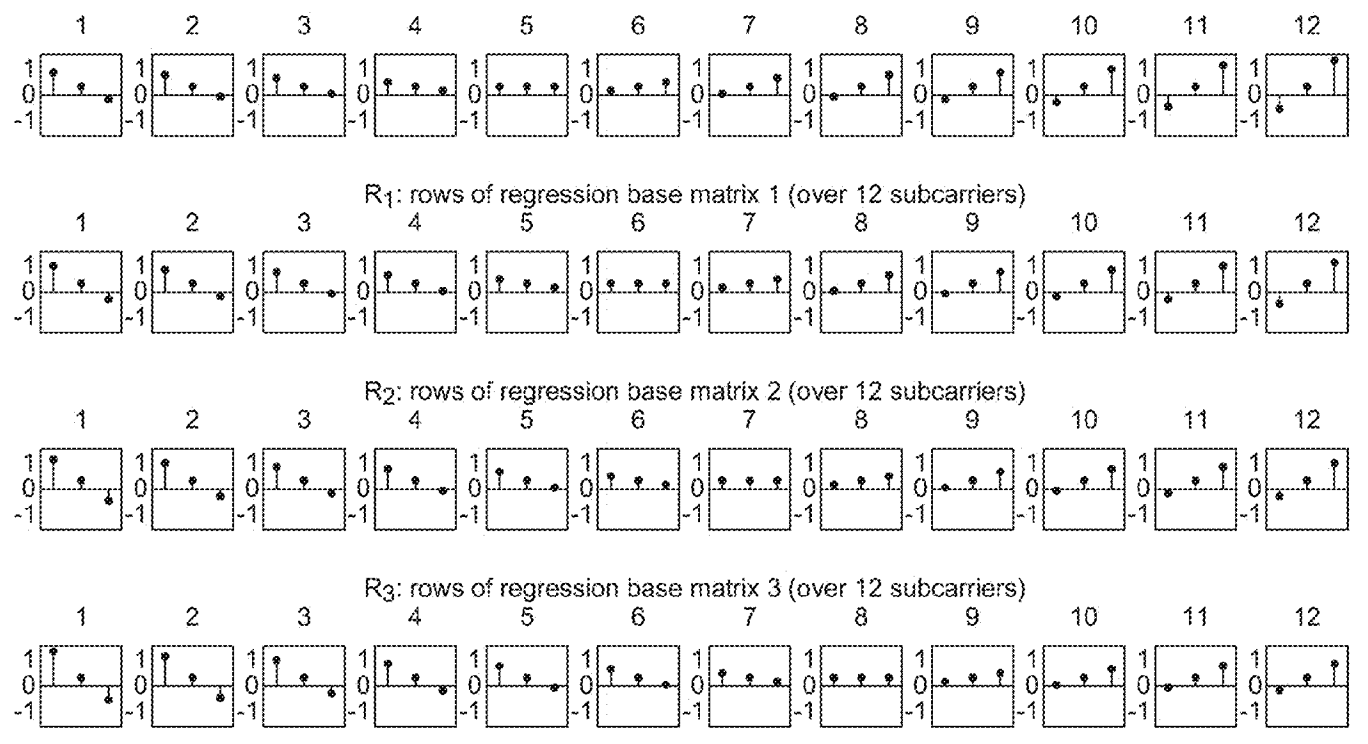

Once the user (and the corresponding base matrix) is selected, the weights are read from the base matrix at the row corresponding to the desired anchor displacement, where the rows are index from 0 to 11. FIG. 8 plots the rows of the regression base matrices for illustration purposes.

Consider the example of computing the entries for the channel state matrix for user 5 and subchannel 49 (of subchannels 37-50). First the appropriate base matrix is selected (e.g. matrix $R_0$). Then the weights are read from the row corresponding to the distance the channel in question is from the anchor point. In this example, subchannel 49 is 11 from the anchor channel 1, so the weights are selected from row 11. Next the weights −0.4167, 0.3333 and 1.0833 are the weights applied to the signals received by the desired antenna on the subchannels on which the pilot signals were received which in this example is subchannels 39, 43 and 47.

Described below are results for a use-case where VFP is shown to substantially reduce the errors caused by extrapolation of precoder estimates at the band edges.

Use Case Study: Variable Fidelity Precoding for Improved Extrapolation Precoders This section provides simulated variable fidelity precoding results. This section continues the example configuration set forth in previous sections for a MU-MIMO-OFDM system with N=256 subcarriers with M=96 antennas at the base station, serving K=24 users. Each frame may consist of an uplink pilot phase configured as in FIG. 6 followed by an uplink data transmission phase and finally a download data transmission phase.

FIG. 8 shows a number of regression base matrices. Notice the "seesaw" pattern across subcarriers as emphasis is swayed from one end of the RB to the other end. For a "baseline system" for comparison a system was considered that uses the following anchor displacement sets: $d_f=d_r=\{6, 6,6,6,6,6,6\}$. This corresponds to setting the channel estimation anchor points midway in each RB for all users and over all antennas. As a result, the left and right bands will each require two (linear) extrapolations to extend the precoder interpolation over the guard-band and control channel edges. To assess the performance of the interpolated (and extrapolated) precoder matrices, a "precoder interpolation error metric" was defined as the residual "energy" on the off-diagonal elements of the equalized channel $C[n]\hat{F}[n]$. Mathematically, this metric is defined as:

$$\epsilon[n] = \|C[n]\hat{F}[n] - \mathrm{diag}(C[n]\hat{F}[n])\|_F^2 \quad (32)$$

Figure 9:
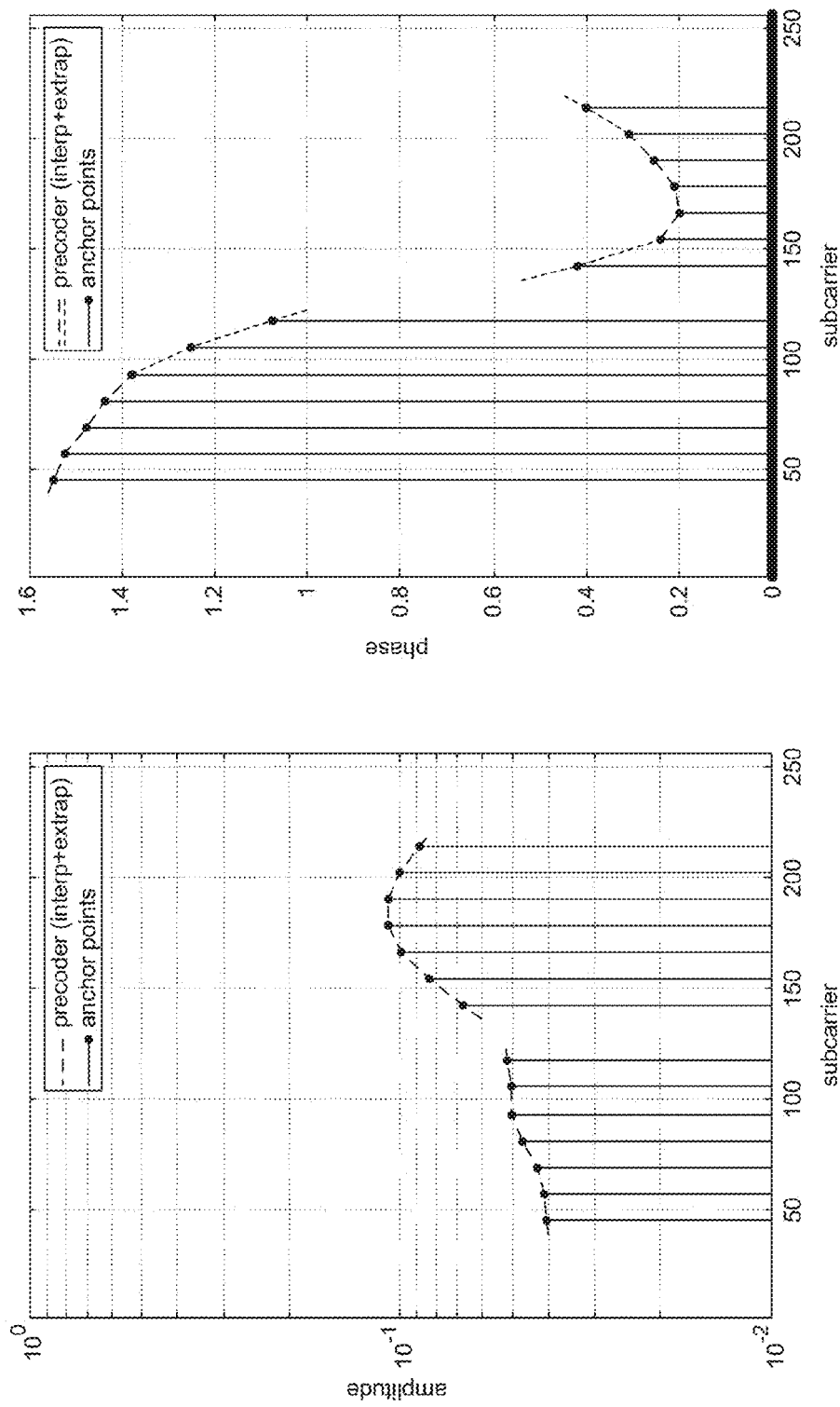
FIG. 9 is a series of plots indicating exemplary amplitude, phase, and anchor points of the precoder values over set of subcarriers for antenna 1 and user 1 of a MU-MIMO system assuming a subchannel in the middle of each resource block is used for interpolation and extrapolation.

FIG. 9 shows the amplitude and phase of the precoder for antenna 1 and user 1 over the subcarriers for the baseline system. Also shown in the figure are the anchor points corresponding to the anchor displacement set $d_f=d_r=\{6, 6, 6, 6, 6, 6, 6\}$. Notice the extrapolation that occurs near the edge of the bands.

Figure 10:
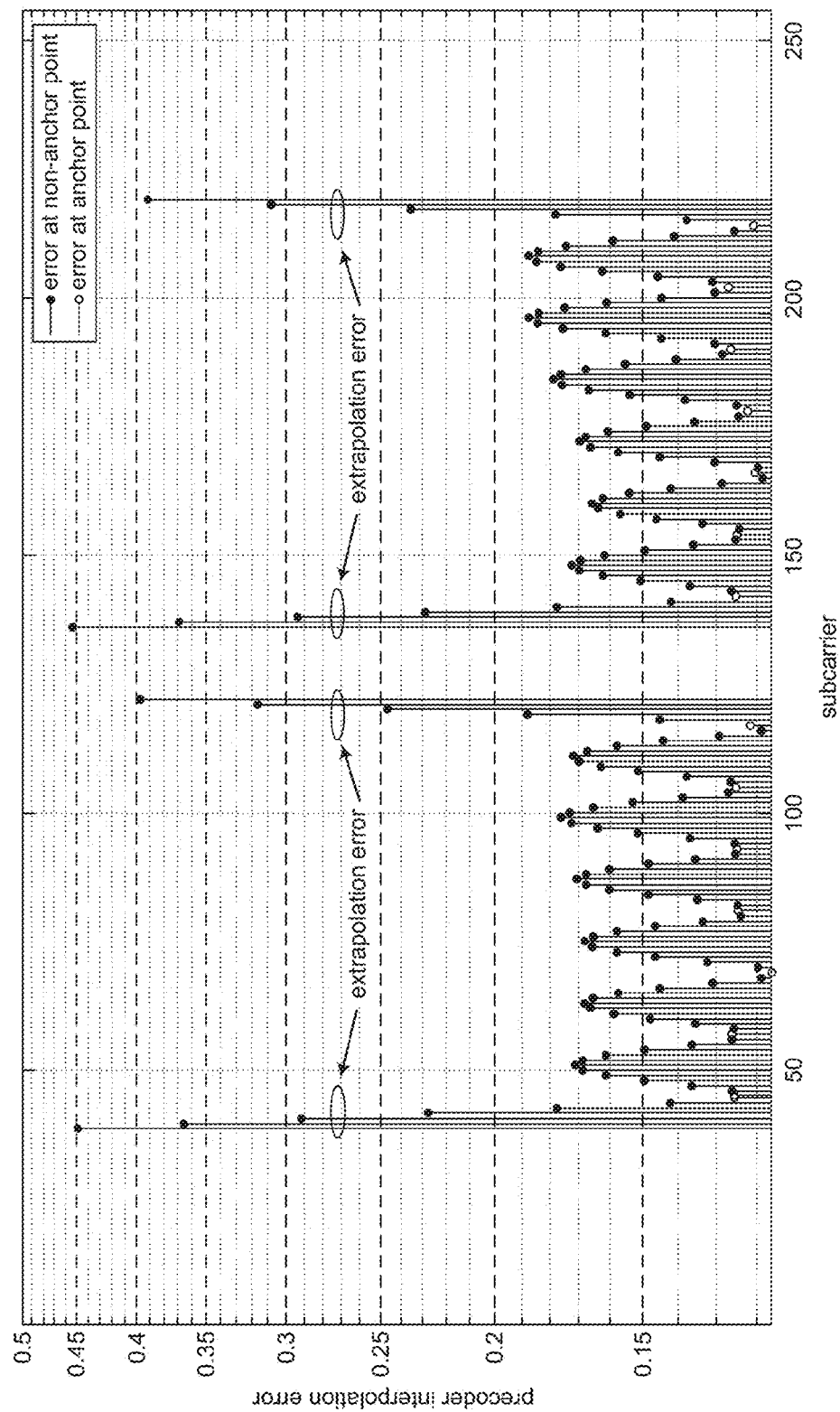
FIG. 10 is a plot illustrating an exemplary precoder interpolation error metric (in dB) for a baseline solution of selecting a middle subchannel in each resource block as an anchor for interpolation and extrapolation.
Figure 11A:
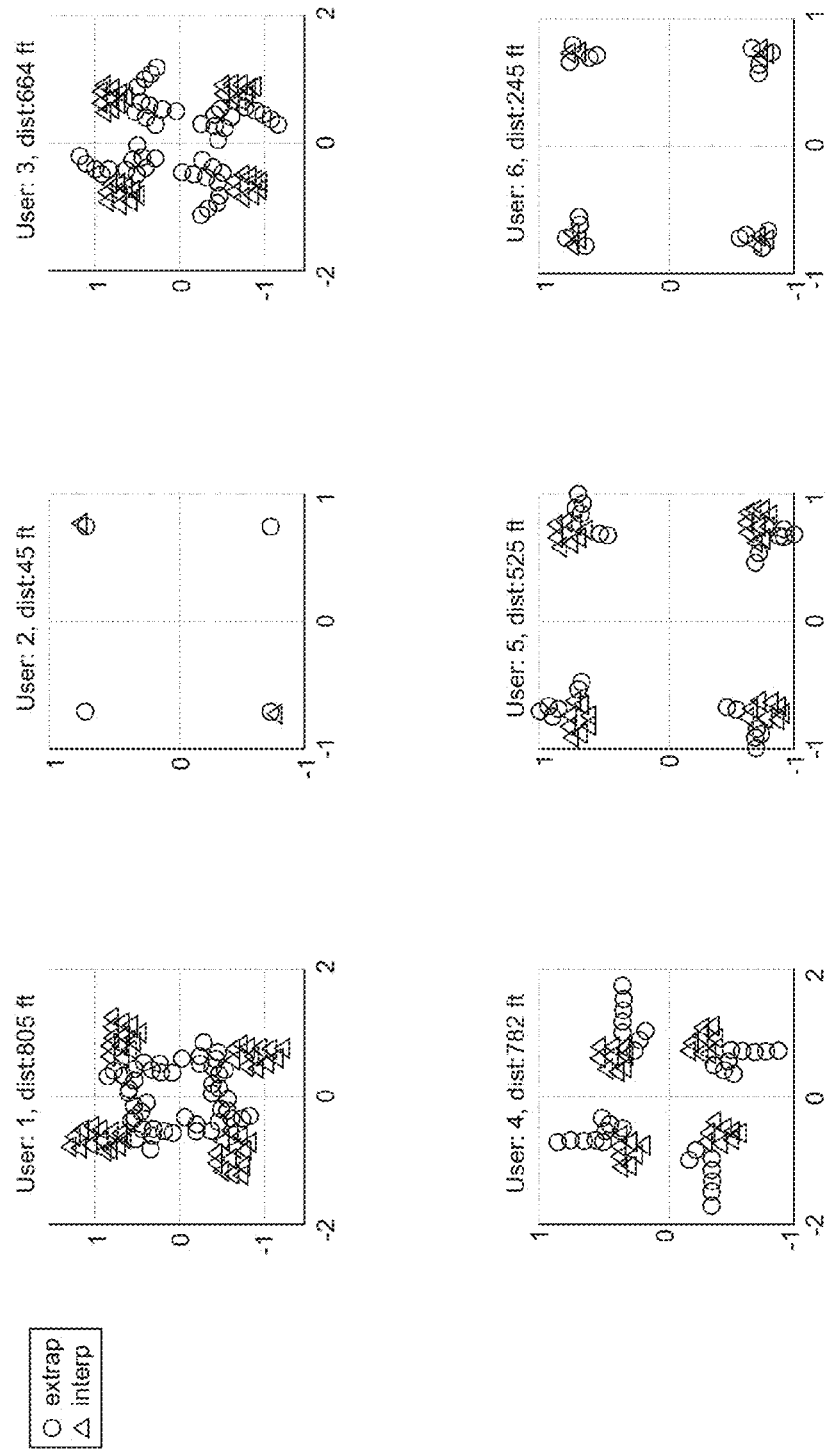
FIGS. 11A-11D are plots of simulated uplink equalized Quadrature Amplitude Modulation (QAM) outputs at a base station over the user set for the baseline solution.
Figure 11B:
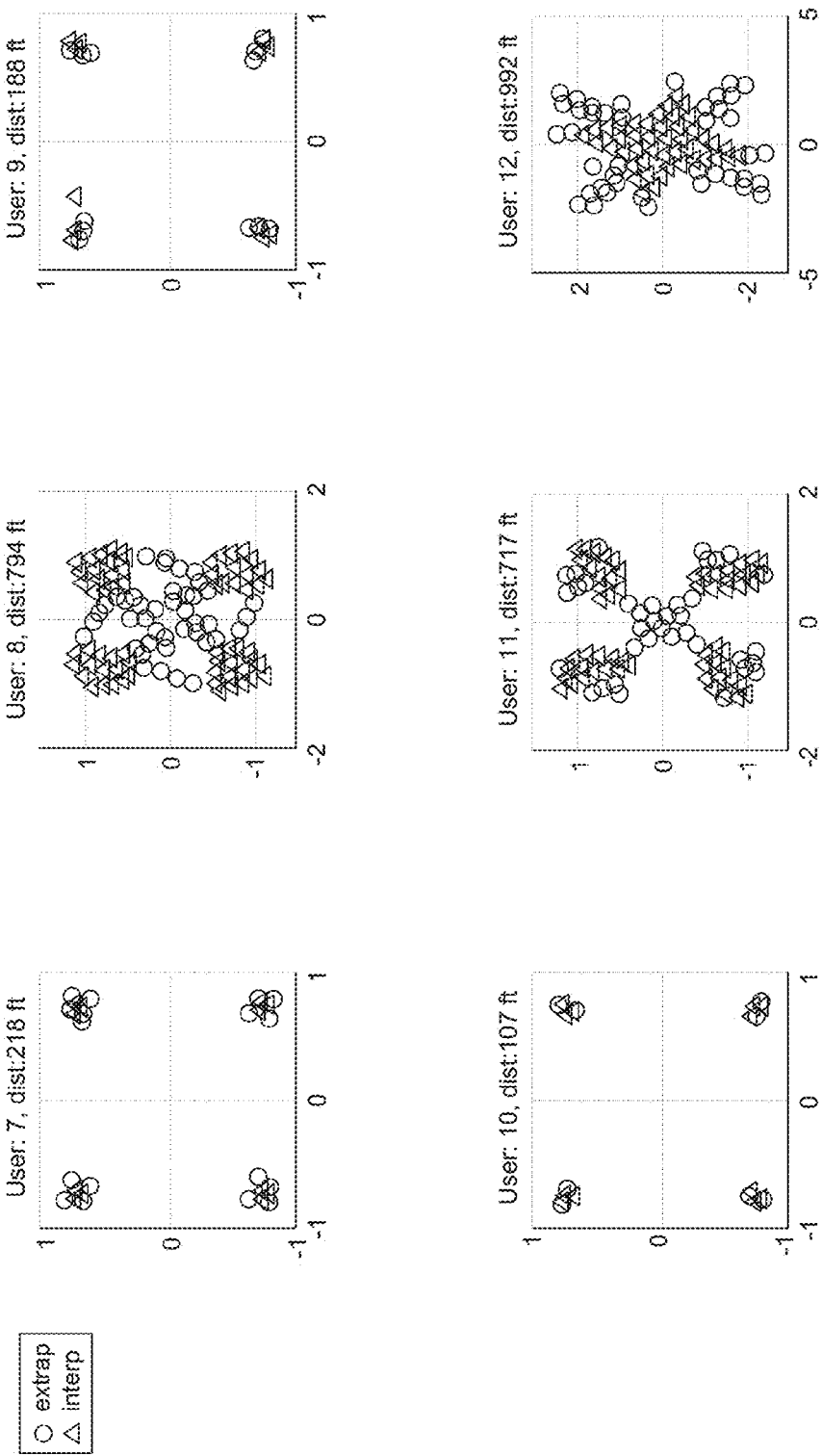
Figure 11C:
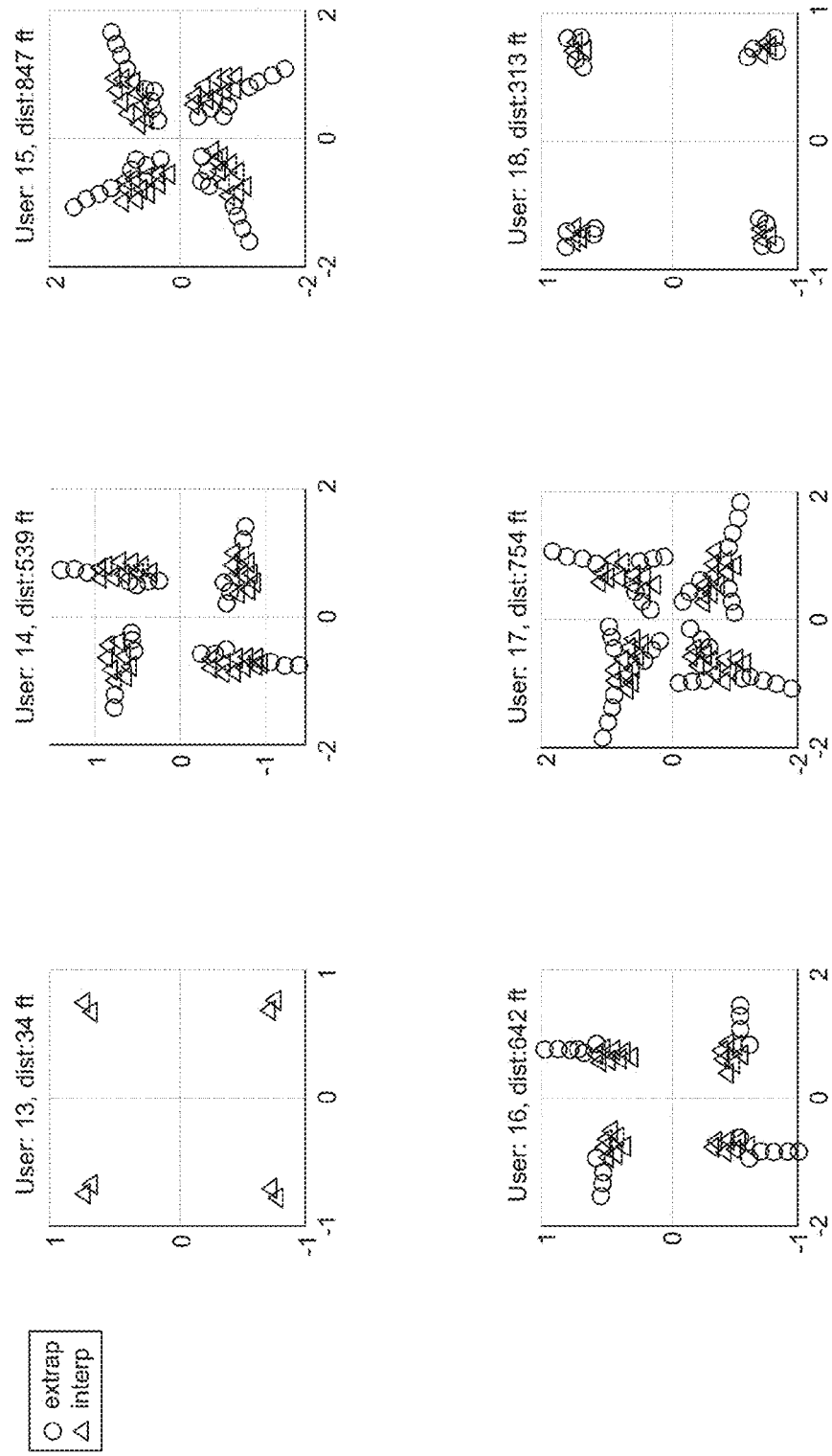
Figure 11D:
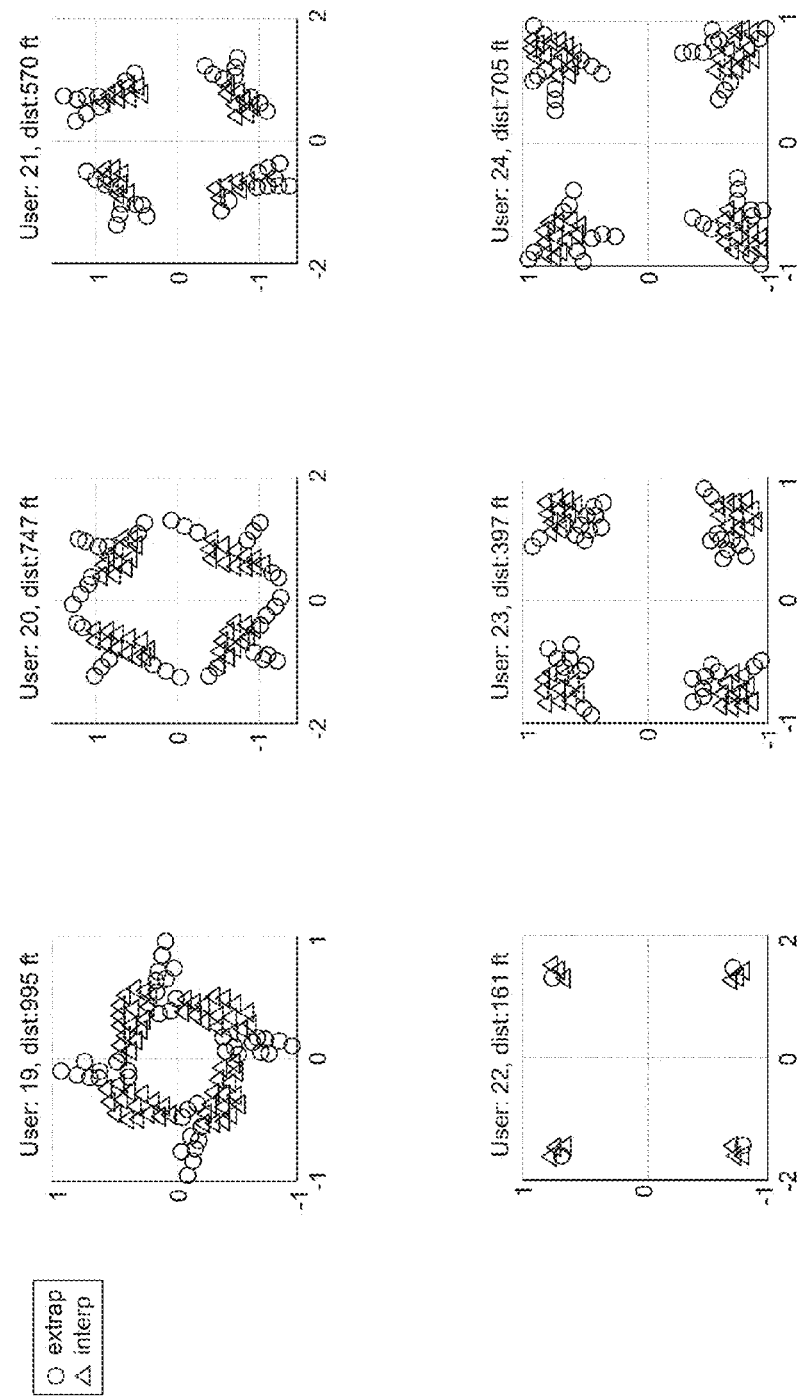

FIG. 10 plots the corresponding precoder interpolation error metric (in dB scale). The negative effects of extrapolation are evident from this plot which shows a steep increase in error at the edges.

Finally, FIGS. 11A-11D show the demodulated QPSK data symbols derived at the base station from the uplink data frames post channel equalization using the estimated (interpolated and extrapolated) precoders of the baseline system. The interpolated and extrapolated symbols are plotted separately to highlight the effects of precoder errors. This figure shows how the example extrapolated portion of the data stream suffers higher loss of accuracy and will likely lead to more errors in detection and hence lower throughput. If left unaddressed, this plot indicates that uplink performance could be severely limited passed roughly 500 feet from the base station.

To alleviate the errors due to extrapolation, various embodiments use of the following displacement sets: $d_f=d_r=\{0, 2, 4, 6, 8, 10, 11\}$. This set will allocate anchors closer to the edges for those for RBs which are themselves closer to the edge. For interior RBs, the anchors will be closer to the mid-point of the RB.

Figure 12:
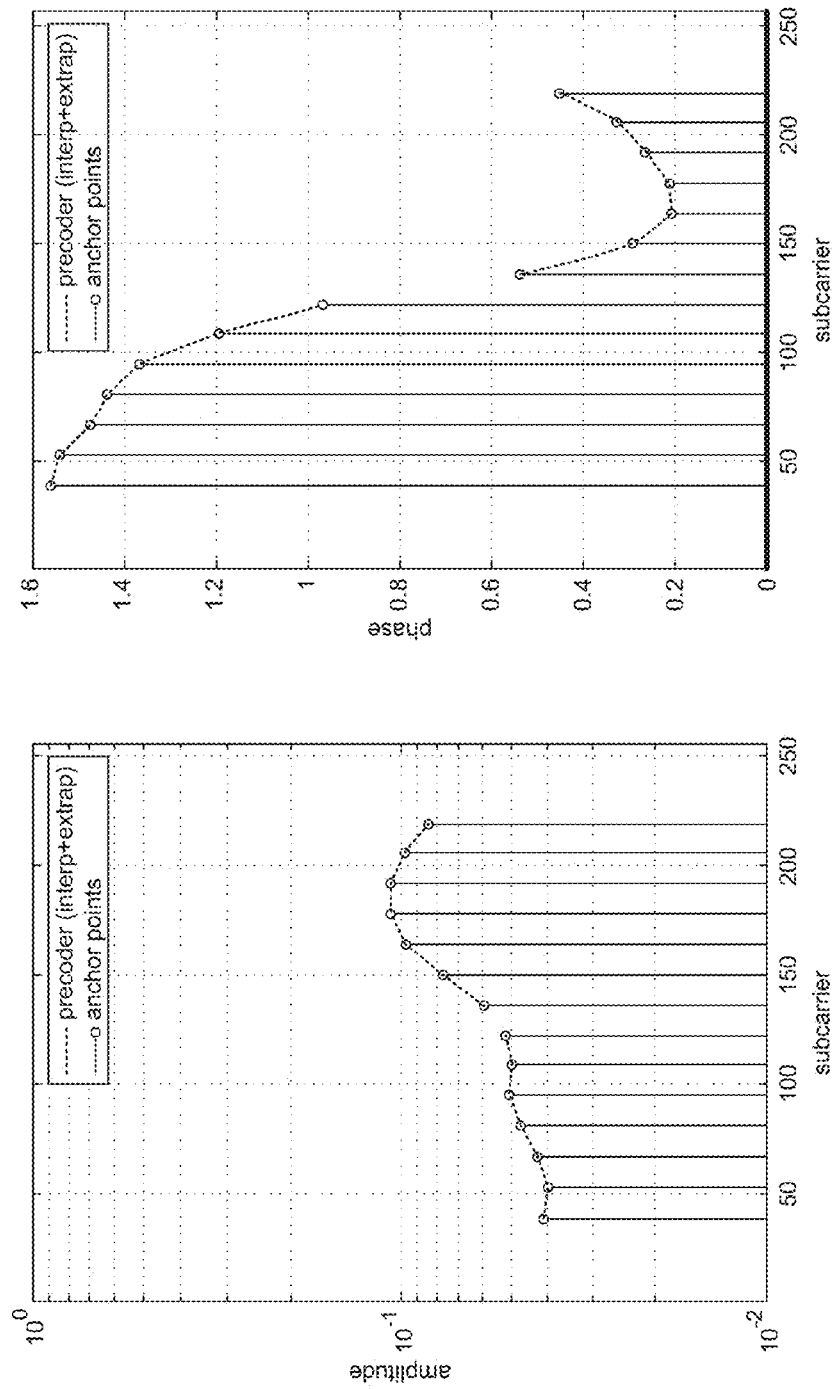
FIG. 12 is a plot of exemplary amplitudes and phases of precoder values for a set of subcarriers for antenna 1 and user 1 of a MU-MIMO system as may occur in some embodiments that are determined using a variable anchor point in the resource blocks for interpolation.
Figure 13:
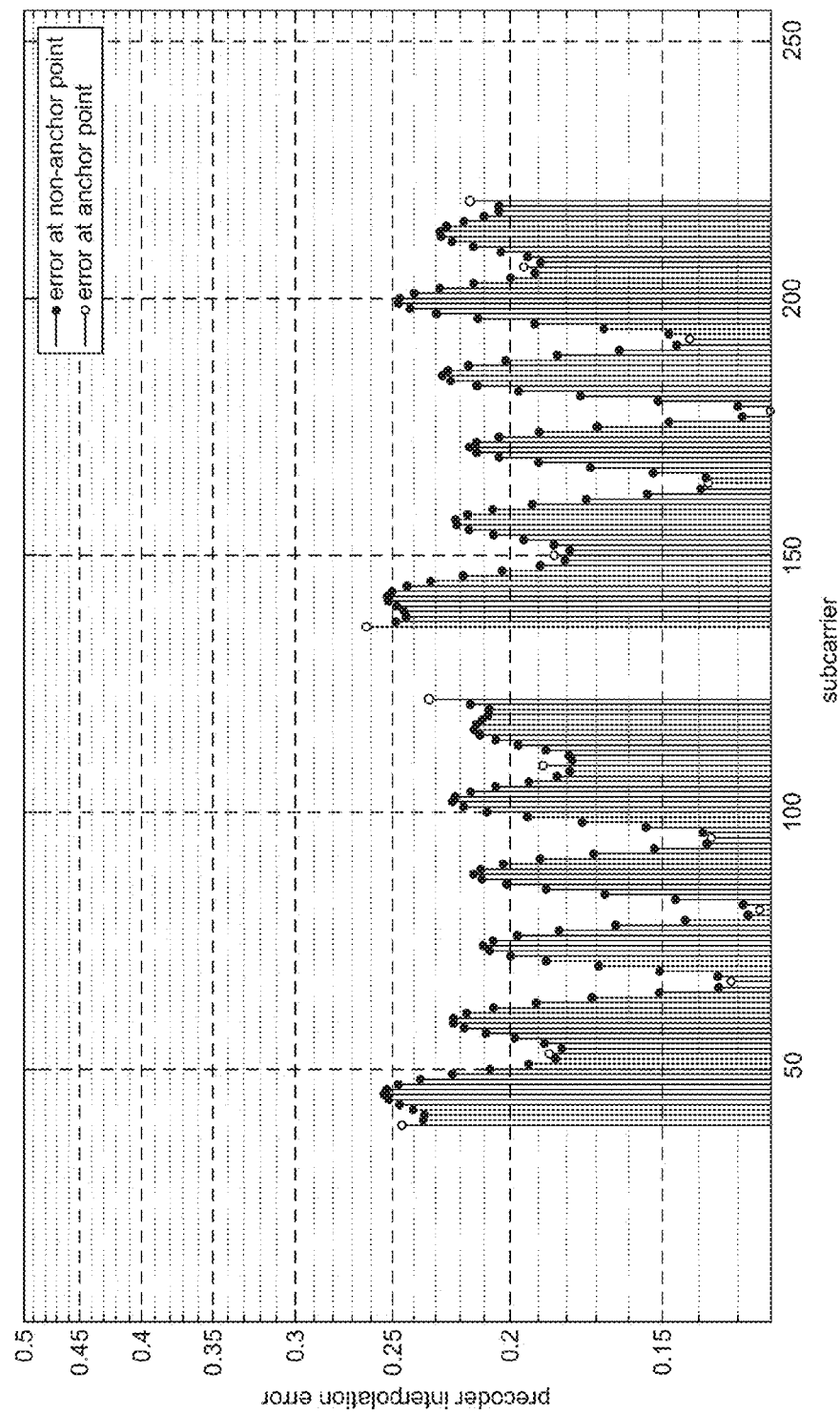
FIG. 13 is a plot of a precoder interpolation error metric (in dB) for a proposed variable anchor point solution in accordance with some embodiments.
Figure 14A:
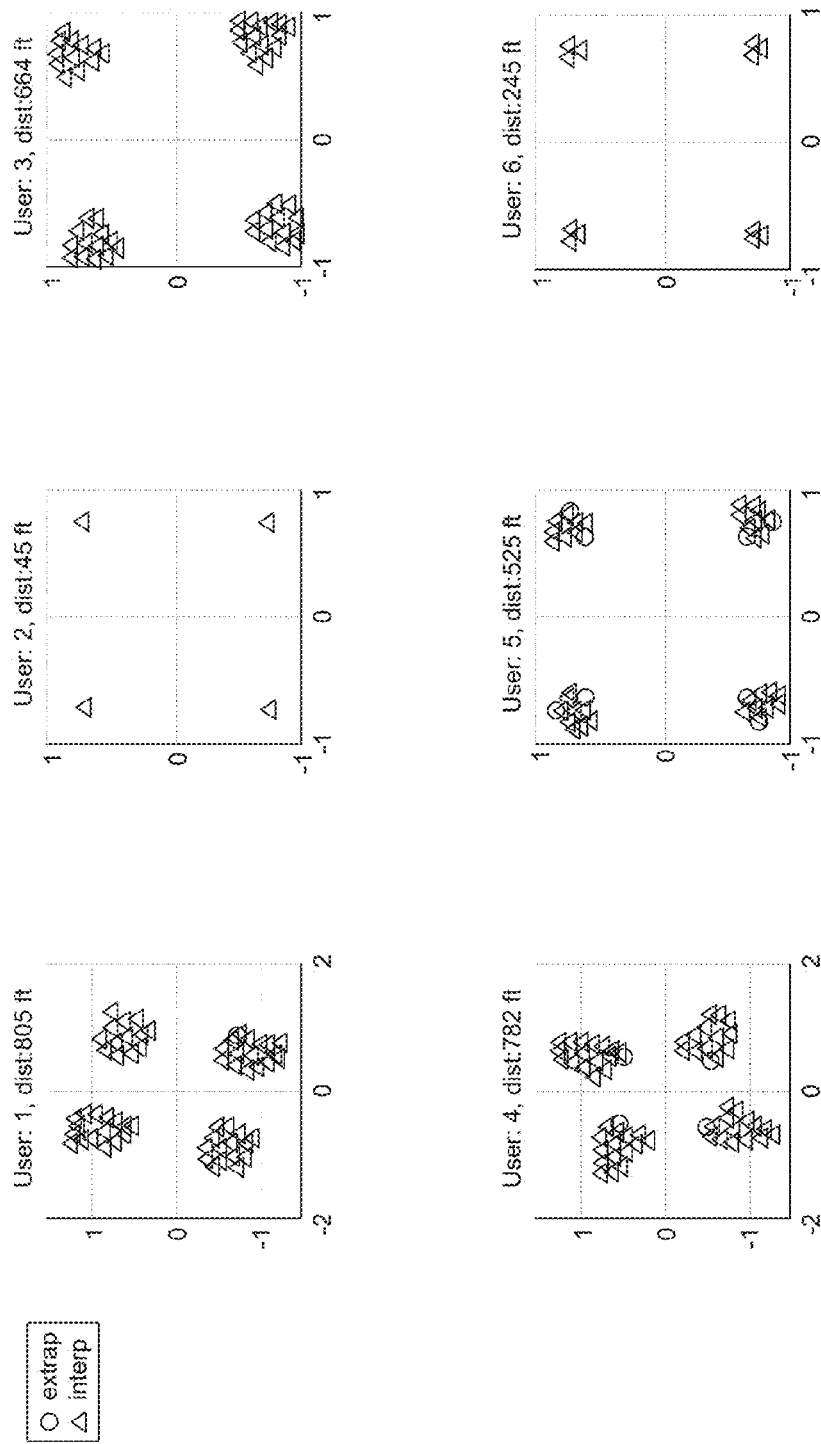
FIGS. 14A-14D are plots of simulated uplink equalized QAM outputs at a base station over a set of subchannels for a proposed variable anchor point solution in accordance with some embodiments.
Figure 14B:
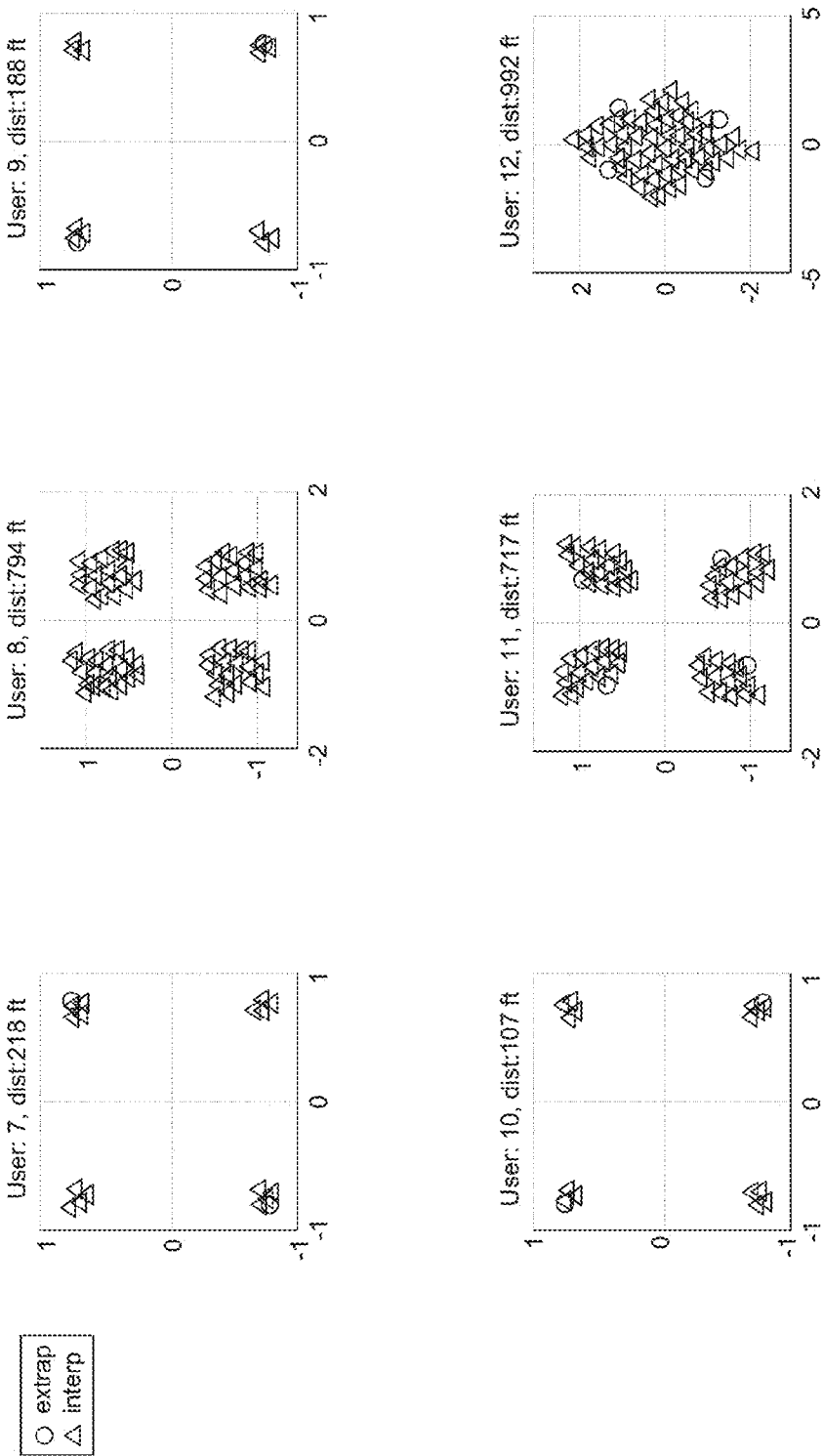
Figure 14C:
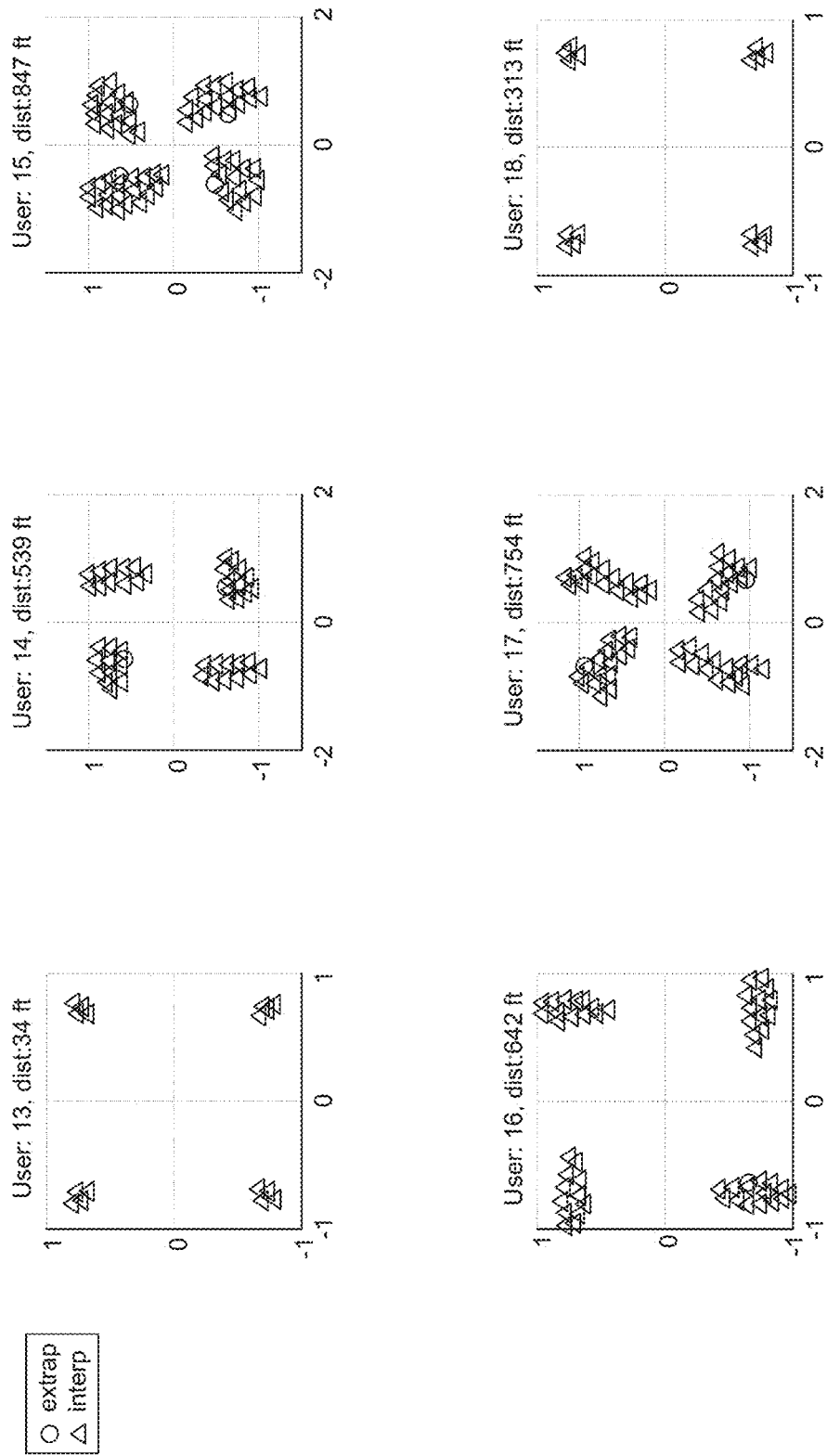
Figure 14D:
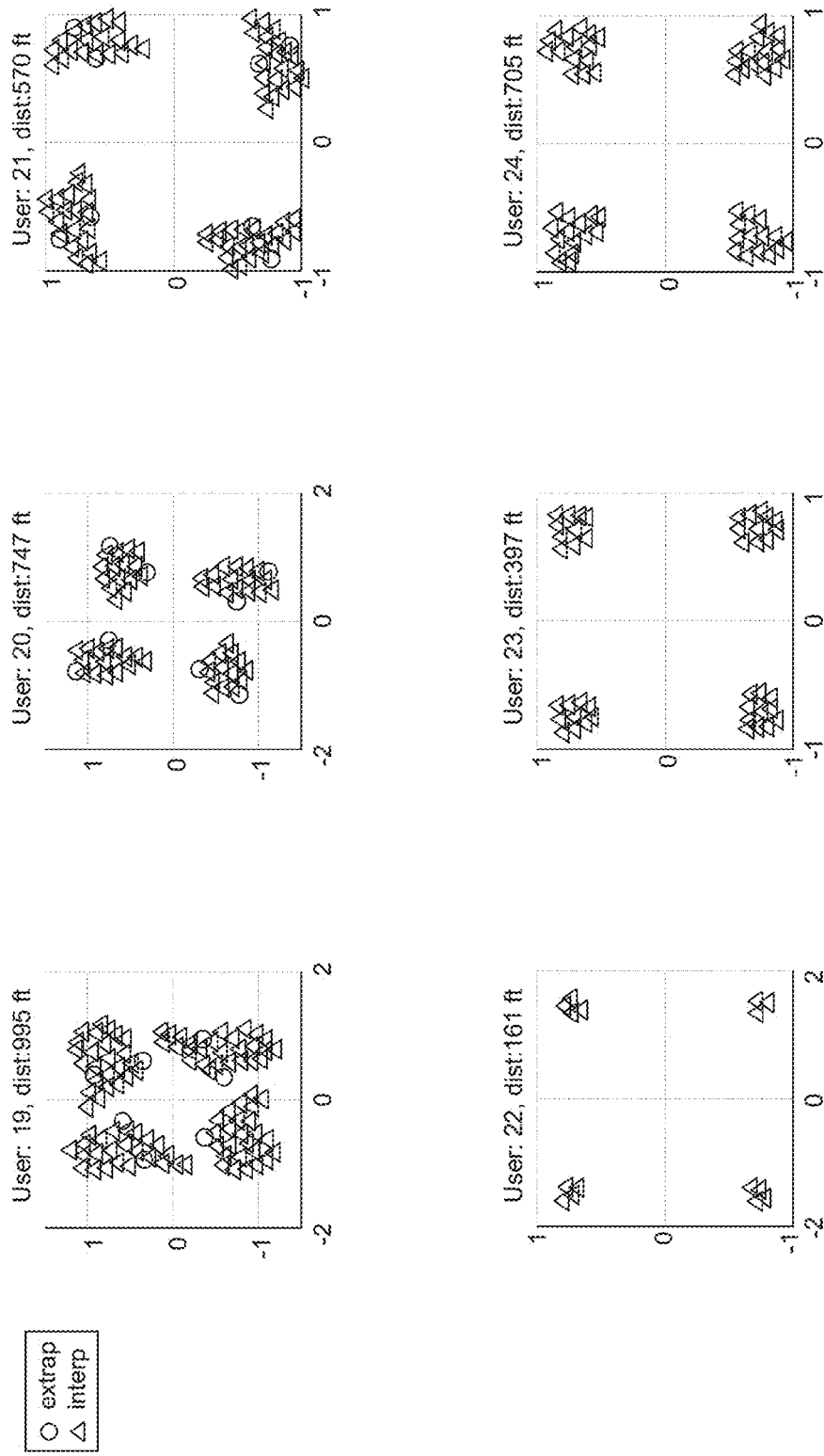

FIG. 12 shows the amplitude and phase of the precoder corresponding to FIG. 4. Notice how the anchors extend to the edges in this case which essentially removes the necessity of extrapolation. FIG. 13 is the corresponding precoder interpolation error metric in dB scale. Comparing FIG. 13 with FIG. 5 one sees a dramatic decrease in error at the edge of the bands with a slight increase in error for the interior subcarriers. Finally, FIG. 14 is the demodulated QPSK symbols at the base station in the uplink. Comparing this figure with FIGS. 11A-11D demonstrates substantial improvement due to better performance at the edges. This plot shows that the proposed VFP system can support a range of over roughly 700 feet.

FIG. 9 illustrates amplitude and phase of the precoder values over subcarriers for antenna 1 and user 1. Also shown are the anchor points. Note the extrapolation at the edges.

FIG. 10 illustrates a precoder interpolation error metric (in dB) for a baseline solution of selecting a fixed subchannel as a basis for interpolating/extrapolating the channel matrices for the other channels. Note the hike in error for the subchannels at the ends of the resource block due to extrapolation.

FIGS. 11A-11D illustrate uplink equalized QAM outputs at the base station over the user set for the baseline solution. Note how the extrapolated symbols (marked by the circles) exhibit poor performance compared to interpolated symbols (marked by the triangles).

FIG. 12 illustrates amplitude and phase values for precoders for subcarriers for antenna 1 and user 1. Also shown are the anchor points. Note the lack of extrapolation points for the proposed VFP scheme.

FIG. 13 illustrates a precoder interpolation error metric (in dB) for a VFP solution in accordance with some disclosed embodiments.

FIGS. 14A-14D are plots of uplink equalized QAM outputs at the base station over the user set for a VFP solution in accordance with disclosed embodiments.

Computer System

Figure 15:
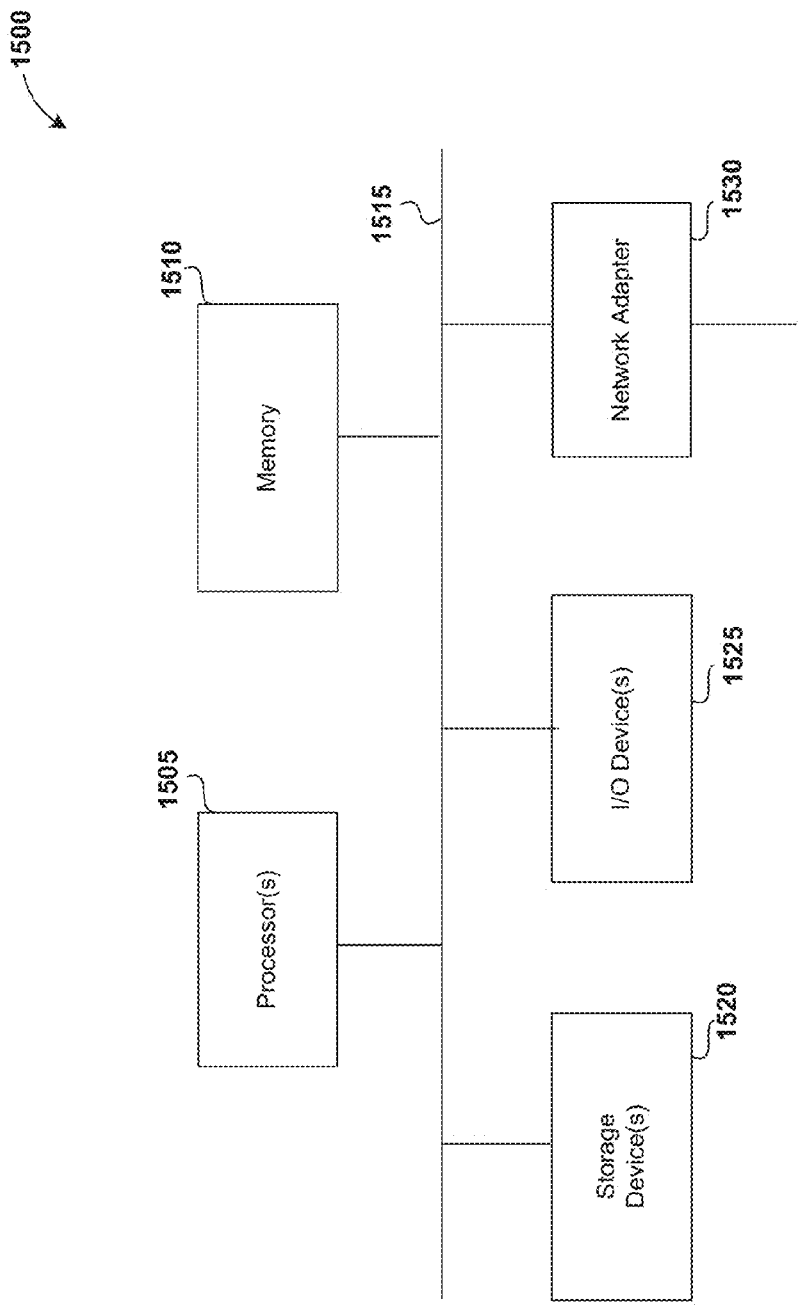
FIG. 15 is a block diagram of a computing system within a base station in accordance with some embodiments.

FIG. 15 is a block diagram of a computing system within a base station as may be used to implement features of some of the disclosed embodiments. In addition to the computing system, the base station includes one or more transceivers, beamformers, antennas and other components (not shown) required for the transmission and reception of radio frequency signals. The computing system 1500 may include one or more central processing units ("processors") 1505, memory 1510, input/output devices 1525 (e.g., keyboard and pointing devices, display devices), storage devices 1520 (e.g., disk drives), and network adapters 1530 (e.g., network interfaces) that are connected to an interconnect 1515. The interconnect 1515 is illustrated as an abstraction that represents any one or more separate physical buses, point to point connections, or both connected by appropriate bridges, adapters, or controllers. The interconnect 1515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 1510 and storage devices 1520 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non-transitory" media) and computer-readable transmission media.

The instructions stored in memory 1510 can be implemented as software and/or firmware to program the processor(s) 1505 to carry out actions described above. In some embodiments, such software or firmware may be initially provided to the processing system 1500 by downloading it from a remote system through the computing system 1500 (e.g., via network adapter 1530).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method, comprising:
   receiving pilot signals on multiple subchannels of a resource block associated with one or more user devices;
   computing channel estimation matrices for the subchannels of the resource block;
   determining a linear regressor that relates the computed channel estimation matrices for the subchannels to a subchannel number;
   selecting an anchor subchannel for the resource block;
   computing weights for each subchannel of the resource block using the linear regressor and a distance that the subchannel is away from the selected anchor subchannel;

computing channel estimation matrices for each subchannel in the resource block by weighting the channel matrices for the subchannels based on the weights that are determined for the corresponding subchannel;
computing precoding matrices for each subchannel in the resource block from the channel estimation matrices determined for the corresponding subchannel;
applying one or more of the computed precoding matrices to one or more signals for generating one or more modified signals; and
communicating, via a corresponding subchannel of the resource block, the one or more modified signals to the one or more user devices.

2. The method of claim 1, further comprising selecting the anchor subchannel to correspond to a subchannel in the resource block where increased accuracy of the one or more precoding matrices is desired.

3. The method of claim 2, wherein multiple resource blocks occupy a frequency range, the method further comprising:
selecting a low frequency subchannel as a first anchor subchannel for a resource block at a lower end of the frequency range and selecting a high frequency subchannel as a second anchor subchannel for a resource block at a higher end of the frequency range.

4. The method of claim 3, further comprising:
selecting a middle frequency subchannel as a third anchor subchannel for a resource block at a middle of the frequency range.

5. The method of claim 1, further comprising determining a precoder matrix for each subchannel from the one or more precoder matrices.

6. The method of claim 5, wherein the precoder matrices for each of the subchannels are determined using interpolation.

7. A method of operating a base station in a radio frequency communication network, comprising:
receiving pilot signals on multiple subchannels of a resource block associated with one or more user devices;
computing channel estimation matrices for subchannels of the resource block on which pilot signals are received;
determining a relationship between the computed channel estimation matrices for the subchannels on which the pilot signals are received and a subchannel number;
selecting an anchor subchannel for the resource block where a desired error in the accuracy of a precoding matrix for the subchannel is minimized;
computing weights for each subchannel of the resource block using the computed relationship and a distance that the subchannel is away from the selected anchor subchannel;
computing channel estimation matrices for each subchannel in the resource block by weighting the channel matrices for the subchannels based on the weights that are computed for each of the subchannels;
computing precoding matrices for each subchannel in the resource block from the channel estimation matrices computed for the corresponding subchannel;
applying one or more of the computed precoding matrices to one or more signals for generating one or more modified signals; and
communicating, via a corresponding subchannel of the resource block, the one or more modified signals to the one or more user devices.

8. The method of claim 7, further comprising:
determining a linear regressor that relates the determined channel estimation matrices for the subchannels on which the pilot signals are received to a subchannel number.

9. The method of claim 7, further comprising:
selecting a subchannel with a low frequency as the anchor subchannel for a resource block at a low end of a frequency range.

10. The method of claim 7, further comprising;
selecting a subchannel with a high frequency as the anchor subchannel for a resource block at a high end of a frequency range.

11. The method of claim 7, further comprising:
selecting a subchannel with a middle frequency as the anchor subchannel for a resource block in a middle of a frequency range.

12. The method of claim 7, further comprising;
computing the precoding matrices for the subchannels as zero forcing precoders.

13. A base station configured for use in a radio frequency communication network, comprising:
an antenna array;
a memory for storing instructions that are executable by a processor;
a processor configured to execute the instructions to determine precoding matrices for subchannels of a resource block by:
receiving pilot signals on a number of subchannels of a resource block associated with one or more user devices;
computing channel estimation matrices for subchannels of a resource block;
determining a relationship between the computed channel estimation matrices for the subchannels and a subchannel number;
selecting an anchor subchannel for the resource block where a desired accuracy of a precoding matrix for the subchannel is highest for the resource block;
computing weights for each subchannel of the resource block using the linear regressor and a distance that the subchannel is away from the selected anchor subchannel;
computing channel estimation matrices for each subchannel in the resource block by weighting the channel matrices for the subchannels on which pilot signals are received with the weights that are computed for the corresponding subchannel;
computing precoding matrices for each subchannel in the resource block from the channel estimation matrices determined for the corresponding subchannel;
applying one or more of the computed precoding matrices to one or more signals for generating one or more modified signals; and
communicating, via a corresponding subchannel of the resource block, the one or more modified signals to the one or more user devices.

14. The base station of claim 13, wherein the instructions are executable by the processor to determine a linear regressor that relates the channel estimation matrices for the subchannels on which the pilot signals are received to a subchannel number.

15. The base station of claim 13, wherein the instructions are executable by the processor to select a subchannel with a low frequency as the anchor subchannel for a resource block at a low end of a frequency range.

16. The base station of claim 13, wherein the instructions are executable by the processor to select a subchannel with a high frequency as the anchor subchannel for a resource block at a high end of the frequency range.

17. The base station of claim 13, wherein the instructions are executable by the processor to select a subchannel with a middle frequency as the anchor subchannel for a resource block in a middle of the frequency range.

18. The base station of claim 13, wherein the instructions are executable by the processor to select determine zero forcing precoders for the precoding matrices for the subchannels.

19. A non-transitory computer-readable storage medium storing instructions configured to cause a computer system to perform a method, the computer-readable storage medium comprising:
- instructions for receiving a plurality of multipath channel estimates from a plurality of user devices, the plurality of multipath channel estimates within a plurality of frequency channel resource blocks, the frequency channel resource blocks located between boundaries of a plurality of considered frequencies;
- instructions for averaging the multipath channel estimates falling within each of the resource blocks to compute average channel estimates for each of the resource blocks;
- instructions for determining frequency offsets for each of the average channel estimates for each of the resource blocks, wherein the frequency offsets are reflective of a displacement of each subchannel for each of the resource blocks from a corresponding anchor subchannel for each of the resource blocks;
- instructions for computing precoding matrices based on interpolation and by using the average channel estimates and the corresponding frequency offsets;
- instructions for applying one or more of the computed precoding matrices to one or more signals for generating one or more modified signals; and
- instructions for communicating, via a corresponding subchannel of the resource block, the one or more modified signals to one or more of the plurality of user devices.

20. A base station, comprising:
- a plurality of antennas;
- at least one processor;
- at least one memory comprising instructions configured to cause the at least one processor to perform a method comprising:
  - receiving a plurality of multipath channel estimates from a plurality of user devices, the plurality of multipath channel estimates within a plurality of frequency channel resource blocks, the frequency channel resource blocks located between boundaries of a plurality of considered frequencies;
  - averaging the multipath channel estimates falling within each of the resource blocks to compute average channel estimates for each of the resource blocks;
  - determining frequency offsets for each of the average channel estimates for each of the resource blocks, wherein the frequency offsets are reflective of a displacement of each subchannel for each of the resource blocks from a corresponding anchor subchannel for each of the resource blocks;
  - computing precoding matrices based on interpolation and by using the average channel estimates and the corresponding frequency offsets; and
  - applying one or more of the computed precoding matrices to one or more signals for generating one or more modified signals;
  - communicating, via a corresponding subchannel of the resource block, the one or more modified signals to one or more of the plurality of user devices.

\* \* \* \* \*